US011592100B2

(12) United States Patent
Bonham et al.

(10) Patent No.: US 11,592,100 B2
(45) Date of Patent: Feb. 28, 2023

(54) UNIFORM CLAMP ACTUATED SHIFT INFINITELY VARIABLE TRANSMISSION SYSTEM

(71) Applicant: TEAM Industries, Inc., Bagley, MN (US)

(72) Inventors: Brandon R. Bonham, Bemidji, MN (US); Shane Clair Okeson, Bagley, MN (US)

(73) Assignee: TEAM Industries, Inc., Bagley, MN (US)

( * ) Notice: Subject to any disclaimer, the term of this patent is extended or adjusted under 35 U.S.C. 154(b) by 244 days.

(21) Appl. No.: 16/918,184

(22) Filed: Jul. 1, 2020

(65) Prior Publication Data

US 2021/0003203 A1 Jan. 7, 2021

Related U.S. Application Data

(60) Provisional application No. 62/869,181, filed on Jul. 1, 2019.

(51) Int. Cl.
*F16H 55/56* (2006.01)
*F16H 61/662* (2006.01)
*F16H 63/06* (2006.01)

(52) U.S. Cl.
CPC ....... *F16H 55/56* (2013.01); *F16H 61/66272* (2013.01); *F16H 63/062* (2013.01)

(58) Field of Classification Search
CPC ......... F16H 61/66268; F16H 61/66254; F16H 2061/66277; F16H 2061/66295;
(Continued)

(56) References Cited

U.S. PATENT DOCUMENTS 2,050,358 A * 8/1936 Mcelroy ................... F16H 9/14
474/46
2,283,392 A * 5/1942 Shadrick ............. F16H 61/6625
474/45
(Continued)

FOREIGN PATENT DOCUMENTS

DE 10327438 A1 1/2004
DE 102015100420 A1 7/2015
(Continued)

OTHER PUBLICATIONS

International Bureau, "International Preliminary Report on Patentability from PCT Application No. PCT/US2016/056409", from Foreign Counterpart to U.S. Appl. No. 15/290,577, filed Apr. 26, 2018, pp. 1 through 8, Published: WO.
(Continued)

*Primary Examiner* — Henry Y Liu
(74) *Attorney, Agent, or Firm* — Fogg & Powers LLC

(57) ABSTRACT

A uniform clamp actuated shift infinitely variable transmission system is provided that includes a drive clutch and a driven clutch. Both the drive clutch and the driven clutch include torque sensitive assemblies. In particular, the drive clutch includes a drive torque sensitive assembly that is in operational communication with a movable drive sheave member of the drive clutch. The drive torque sensitive assembly is configured to move the movable drive sheave member in relation to a fixed drive sheave member based at least on torque applied to the drive torque sensitive assembly. The driven clutch includes a driven torque sensitive assembly that is in operational communication with a movable driven sheave member of the driven clutch. The driven torque sensitive assembly is configured to move the movable driven sheave member in relation to a fixed driven sheave
(Continued)

member based at least on torque applied to the driven torque sensitive assembly.

17 Claims, 13 Drawing Sheets

(58) Field of Classification Search
 CPC ............... F16H 61/6625; F16H 55/56; F16H 61/66272; F16H 63/062
 USPC ........................................................ 474/21
 See application file for complete search history.

(56) References Cited

U.S. PATENT DOCUMENTS

| | | | | |
|---|---|---|---|---|
| 2,651,208 A * | 9/1953 | Karig | ..................... | F16H 9/12 474/19 |
| 2,993,385 A * | 7/1961 | Karig | ............... | F16H 61/66272 474/18 |
| 3,043,152 A * | 7/1962 | Karig | .................... | F16H 61/662 474/18 |
| 3,052,132 A * | 9/1962 | Karig | .................... | F16H 61/662 474/18 |
| 3,110,188 A * | 11/1963 | Gesche | ..................... | F16H 9/16 474/31 |
| 3,110,189 A * | 11/1963 | Steuer | ..................... | F16H 9/16 474/18 |
| 3,490,301 A * | 1/1970 | Steuer | ..................... | F16H 9/16 474/31 |
| 4,005,609 A * | 2/1977 | Bendall | ..................... | F16H 9/24 474/245 |
| 4,116,080 A * | 9/1978 | Berens | ..................... | F16H 9/20 474/31 |
| 4,187,732 A * | 2/1980 | Takagi | ............. | F16H 61/66268 474/37 |
| 4,348,197 A * | 9/1982 | Oliver | .................... | F16H 55/56 474/28 |
| 4,380,444 A * | 4/1983 | Dolza | ....................... | F16H 9/12 474/30 |
| 4,439,170 A * | 3/1984 | Steuer | ................ | F16H 61/6625 474/18 |
| 4,523,917 A * | 6/1985 | Schildt | ............... | F16H 61/6625 474/19 |
| 4,969,856 A * | 11/1990 | Miyata | ..................... | F16H 9/18 474/11 |
| 4,982,822 A * | 1/1991 | Petzold | ................. | B60W 30/18 701/68 |
| 5,045,028 A * | 9/1991 | Rattunde | ........... | F16H 61/66259 474/19 |
| 5,720,681 A * | 2/1998 | Benson | ............... | F16H 63/067 474/10 |
| 5,848,949 A * | 12/1998 | Miyata | ................. | F16H 37/0846 475/210 |
| 5,890,991 A * | 4/1999 | Sakakiyama | ..... | F16H 61/66259 701/52 |
| 6,030,311 A * | 2/2000 | Osumi | ................ | F16H 61/6648 476/18 |
| 6,086,506 A * | 7/2000 | Petersmann | ...... | F16H 61/66259 477/45 |
| 6,120,399 A * | 9/2000 | Okeson | .................... | F16H 55/56 474/14 |
| 6,142,898 A * | 11/2000 | Miyata | .................. | F16H 57/035 475/210 |
| 6,146,295 A * | 11/2000 | Mor | .................... | F16H 61/6625 474/19 |
| 6,231,477 B1 * | 5/2001 | Hollingsworth | .... | F16H 61/0213 477/107 |
| 6,363,805 B1 * | 4/2002 | Marchart | ........... | F16H 59/0204 74/335 |
| 6,379,274 B1 * | 4/2002 | Robert | .................... | F16H 55/56 474/8 |
| 6,565,465 B2 * | 5/2003 | Nishigaya | ............... | F16H 55/56 474/18 |
| 6,569,043 B2 * | 5/2003 | Younggren | ............. | F16H 55/56 474/19 |
| 6,585,613 B1 * | 7/2003 | Walter | ............. | F16H 61/66272 474/70 |
| 6,743,129 B1 * | 6/2004 | Younggren | ............. | F16H 55/56 474/19 |
| 6,755,759 B2 * | 6/2004 | Blanchard | .................. | F16H 9/18 474/37 |
| 6,786,844 B2 * | 9/2004 | Fritzer | ..................... | F16H 59/16 475/213 |
| 7,207,920 B2 * | 4/2007 | Jonsson | ................ | F16H 63/062 477/44 |
| 7,771,300 B2 * | 8/2010 | Starkey | .................. | F16H 63/062 474/14 |
| 7,951,026 B2 * | 5/2011 | Soga | .................... | F16H 61/0206 474/28 |
| 8,414,433 B2 * | 4/2013 | Kadokawa | ................. | F16H 9/18 474/18 |
| 8,527,166 B2 * | 9/2013 | Tamura | ............. | F16H 61/66259 701/55 |
| 8,645,035 B2 * | 2/2014 | Rioux | ............... | F16H 61/66272 701/61 |
| 8,682,549 B2 * | 3/2014 | Roberge | .................. | F16H 55/56 474/11 |
| 8,753,248 B2 * | 6/2014 | Fujita | ................ | F16H 61/66272 474/18 |
| 8,892,316 B2 | 11/2014 | Eguchi et al. | | |
| 9,394,992 B2 * | 7/2016 | Fujimura | .......... | F16H 61/66259 |
| 9,429,235 B2 * | 8/2016 | Krosschell | ........ | F16H 61/66259 |
| 9,476,486 B2 * | 10/2016 | Hochmayr | ............ | F16H 63/065 |
| 9,759,313 B2 * | 9/2017 | Nelson | ................ | F16H 61/0248 |
| 10,486,705 B2 * | 11/2019 | Haack | ....................... | F16H 59/54 |
| 10,711,888 B2 * | 7/2020 | Tardif-Leblanc | ..... | F16H 63/062 |
| 2002/0072441 A1 * | 6/2002 | Inoue | ................ | F16H 61/66259 474/18 |
| 2005/0277502 A1 * | 12/2005 | Wood | ..................... | F16H 63/062 474/19 |
| 2007/0026981 A1 * | 2/2007 | Blanchard | ......... | F16H 61/66272 474/37 |
| 2008/0053731 A1 * | 3/2008 | Asaoka | .............. | F16H 61/66259 474/18 |
| 2011/0118915 A1 * | 5/2011 | Ortmann | .................. | B60K 6/48 180/65.265 |
| 2011/0166755 A1 * | 7/2011 | Eguchi | ................ | B60W 30/188 701/54 |
| 2011/0320094 A1 * | 12/2011 | Plath | ....................... | F16H 61/16 701/51 |
| 2012/0143451 A1 * | 6/2012 | Nishida | ............. | F16H 61/66259 701/52 |
| 2017/0082193 A1 * | 3/2017 | David | ................. | F16H 61/0213 |
| 2019/0092312 A1 * | 3/2019 | Hamrin | ............ | F16H 61/66272 |
| 2019/0285150 A1 * | 9/2019 | Zurbruegg | ................ | F16H 9/14 |
| 2020/0173534 A1 * | 6/2020 | O'Reilly | ............ | F16H 61/66272 |
| 2021/0215248 A1 * | 7/2021 | Matsuo | .................. | F16H 61/12 |

FOREIGN PATENT DOCUMENTS

| | | |
|---|---|---|
| EP | 1529989 A2 | 5/2005 |
| EP | 2716937 A1 | 4/2014 |
| FR | 1106748 A | 12/1955 |
| WO | 2017066179 A1 | 4/2017 |

OTHER PUBLICATIONS

International Bureau, "International Preliminary Report on Patentability from PCT Application No. PCT/US2018/052613", from Foreign Counterpart to U.S. Appl. No. 16/141,255, filed Apr. 9, 2020, pp. 1 through 10, Published: WO.
U.S. Patent and Trademark Office, "Office Action", U.S. Appl. No. 16/141,255, dated May 15, 2020, pp. 1 through 24, Published: US.
International Searching Authority, "International Search Report and Written Opinion from PCT Application No. PCT/US2018/052613 dated Jan. 16, 2019", from Foreign Counterpart to U.S. Appl. No. 16/141,255, pp. 1-16, Published: WO.
U.S. Patent and Trademark Office, "Final Office Action", U.S. Appl. No. 15/290,577, dated May 1, 2019, pp. 1-7, Published: US.

(56) References Cited

OTHER PUBLICATIONS

U.S. Patent and Trademark Office, "Final Office Action", U.S. Appl. No. 16/141,255, dated Oct. 19, 2020, pp. 1 through 14, Published: US.
U.S. Patent and Trademark Office, "Notice of Allowance", U.S. Appl. No. 15/290,577, dated Jul. 31, 2019, pp. 1-8, Published: US.
U.S. Patent and Trademark Office, "Office Action", U.S. Appl. No. 15/290,577, dated Nov. 15, 2018, pp. 1 through 21, Published: US.
International Searching Authority, "International Search Report and Written Opinion from PCT Application No. PCT/US2020/040442", from Foreign Counterpart to U.S. Appl. No. 16/918,184, dated Sep. 18, 2020, pp. 1 through 18, Published: WO.

* cited by examiner

UNIFORM CLAMP ACTUATED SHIFT INFINITELY VARIABLE TRANSMISSION SYSTEM

CROSS-REFERENCE TO RELATED APPLICATIONS

This application claims priority to U.S. Provisional Application Ser. No. 62/869,181, same title herewith, filed on Jul. 1, 2019, which is incorporated in its entirety herein by reference.

BACKGROUND

Continuously variable transmission (CVT) or infinitely variable transmission (IVT) systems for off road utility vehicles, on road vehicles, golf carts, snowmobiles, industrial implements, energy conversion/storage devices, etc., comprises a drive clutch (sheave) and a driven clutch (sheave) in which torque is communicated between the two by a flexible, endless loop member such as a belt. In a typical system, the drive clutch employs the use of an RPM sensitive (centrifugal) drive clutch that is operational communication with an engine and a torque sensitive driven clutch that is in operational communication with a transmission. These systems are typically balanced such that the belt clamp forces produced by the RPM sensitive elements in the drive clutch resist the belt clamp forces produced by the torque sensitive elements in the driven clutch.

SUMMARY

The following summary is made by way of example and not by way of limitation. It is merely provided to aid the reader in understanding some of the aspects of the subject matter described. Embodiments provide a CVT/IVT system that incorporates a torque sensitive assembly in both the drive clutch and the driven clutch. Further embodiments provide a sheave with a torque sensitive assembly and actuator arrangement.

In one embodiment, a UCAS IVT system that includes a drive clutch and a driven clutch is provided. The drive clutch included a drive post, a movable drive sheave member, a fixed drive sheave member and a drive torque sensitive assembly. The drive post is operationally coupled to a motor. The movable drive sheave member is slidably mounted on the drive post. The fixed drive sheave member is mounted in an axially fixed configuration on the drive post. The drive torque sensitive assembly is in operational communication with the movable drive sheave member. The drive torque sensitive assembly is configured to move the movable drive sheave member in relation to the fixed drive sheave member based at least on torque applied to the drive torque sensitive assembly. The drive clutch and driven clutch are configured to communicate torque and rotation between each other with an endless loop member. The driven clutch includes a driven post, a movable driven sheave member, a fixed driven sheave member and a driven torque sensitive assembly. The driven post is operationally coupled to a drivetrain. The movable driven sheave member is slidably mounted on the driven post. The fixed driven sheave member is mounted in an axially fixed configuration on the driven post. The driven torque sensitive assembly is in operational communication with the movable driven sheave member. The driven torque sensitive assembly is configured to move the movable driven sheave member in relation to the fixed driven sheave member based at least on torque applied to the driven torque sensitive assembly.

In another embodiment, a sheave assembly for a uniform clamp actuated shift infinitely variable transmission system is provided. The sheave assembly includes a sheave, a post, movable sheave member, a fixed sheave member, a torque sensitive assembly and an actuator. The movable sheave member is slidably mounted on the post. The fixed sheave member is mounted in an axially fixed configuration on the post. The torque sensitive assembly is in operational communication with the movable sheave member. The torque sensitive assembly is configured to move the movable drive sheave member in relation to the fixed sheave member based on torque applied to the drive torque sensitive assembly. The actuator is operationally coupled the movable sheave member to selectively move the movable sheave member independent of the drive torque sensing assembly.

In still another embodiment, a vehicle having a uniform clamp actuated shift infinitely variable transmission (UCAS IVT) system is provided. The vehicle includes a motor, a drivetrain and the UCAS IVT system. The motor is used to generate engine torque and rotation. The UCAS IVT system includes an endless loop member, drive clutch, a driven clutch and at least one actuator. The drive clutch includes a drive post, a movable drive sheave member, a fixed drive sheave member and a drive torque sensitive assembly. The drive post is operationally coupled to the motor. The movable drive sheave member is slidably mounted on the drive post. The fixed drive sheave member is mounted in an axially fixed configuration on the drive post. The drive torque sensitive assembly is in operational communication with the movable drive sheave member. The drive torque sensitive assembly is configured to move the movable drive sheave member in relation to the fixed drive sheave member based at least in part on torque applied to the drive torque sensitive assembly. The drive clutch and driven clutch are configured to communicate torque and rotation between each other with the endless loop member. The driven clutch includes a driven post, a movable driven sheave member, a fixed driven sheave member and a driven torque sensitive assembly. The driven post is operationally coupled to the drivetrain. The movable driven sheave member is slidably mounted on the driven post. The fixed driven sheave member is mounted in an axially fixed configuration on the driven post. The driven torque sensitive assembly is in operational communication with the movable driven sheave member. The driven torque sensitive assembly is configured to move the movable driven sheave member in relation to the fixed driven sheave member based on torque applied to the driven torque sensitive assembly. The at least one actuator is operationally coupled to one of the drive clutch and driven clutch to selectively move one of the movable drive sheave member and the movable driven sheave member independent of the respective drive torque sensing assembly and driven torque assembly to achieve at least one of uniform clamping of the endless loop member and to produce a ratio change across the UCAS IVT system.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof. Terms such as, but not limited to, "operationally coupled" or "in operational communication" used herein relate to connections between elements and/or assemblies The terms include both a direct connection between the elements and/or assemblies as well as connections that occurs through one or more elements and/or assemblies that provide a cause and effect reaction between the elements and/or assemblies.

Embodiments provide a uniform clamp actuated shift infinitely variable transmission (UCAS IVT) system that implements torque elements in both the drive clutch and the driven clutch of the IVT. The UCAS IVT system provides a dual torque sensitive system that reduces/eliminates the requirement for an actuator to supply full belt clamp force necessary to transmit or couple torque/power between sheaves in an IVT system in certain situations. Advantages to this design includes the ability to use smaller actuators to selectively control the shifting of the IVT, a lower force requirement that allows the actuator to complete a shift sequence faster and less energy required to power the actuator. Further, some embodiments of the UCAS IVT system are capable of sensing torque in both directions, driving (from a drive clutch to a driven clutch) and back driving (from the driven clutch to the drive clutch).

Figure 1A:
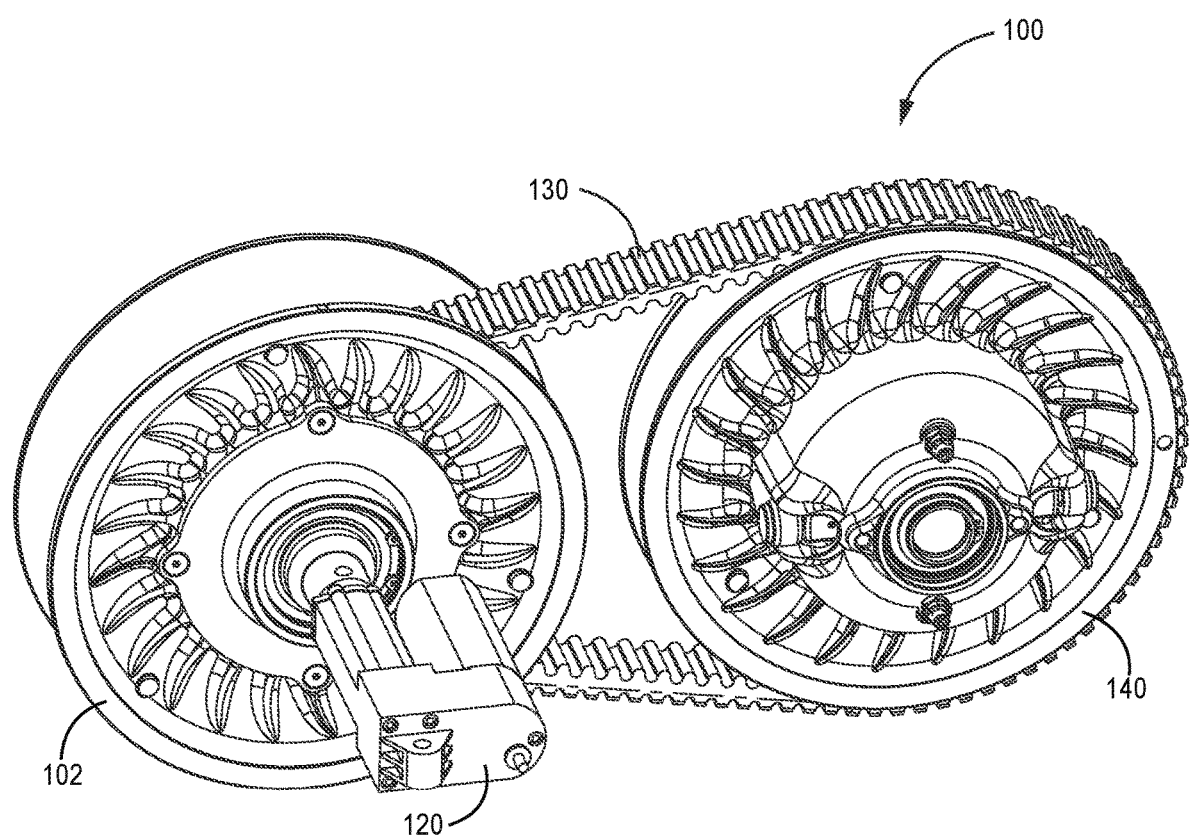
FIG. 1A is a side perspective view of a uniform clamp actuated shift infinitely variable transmission (UCAS IVT) system according to one exemplary embodiment.
Figure 1B:
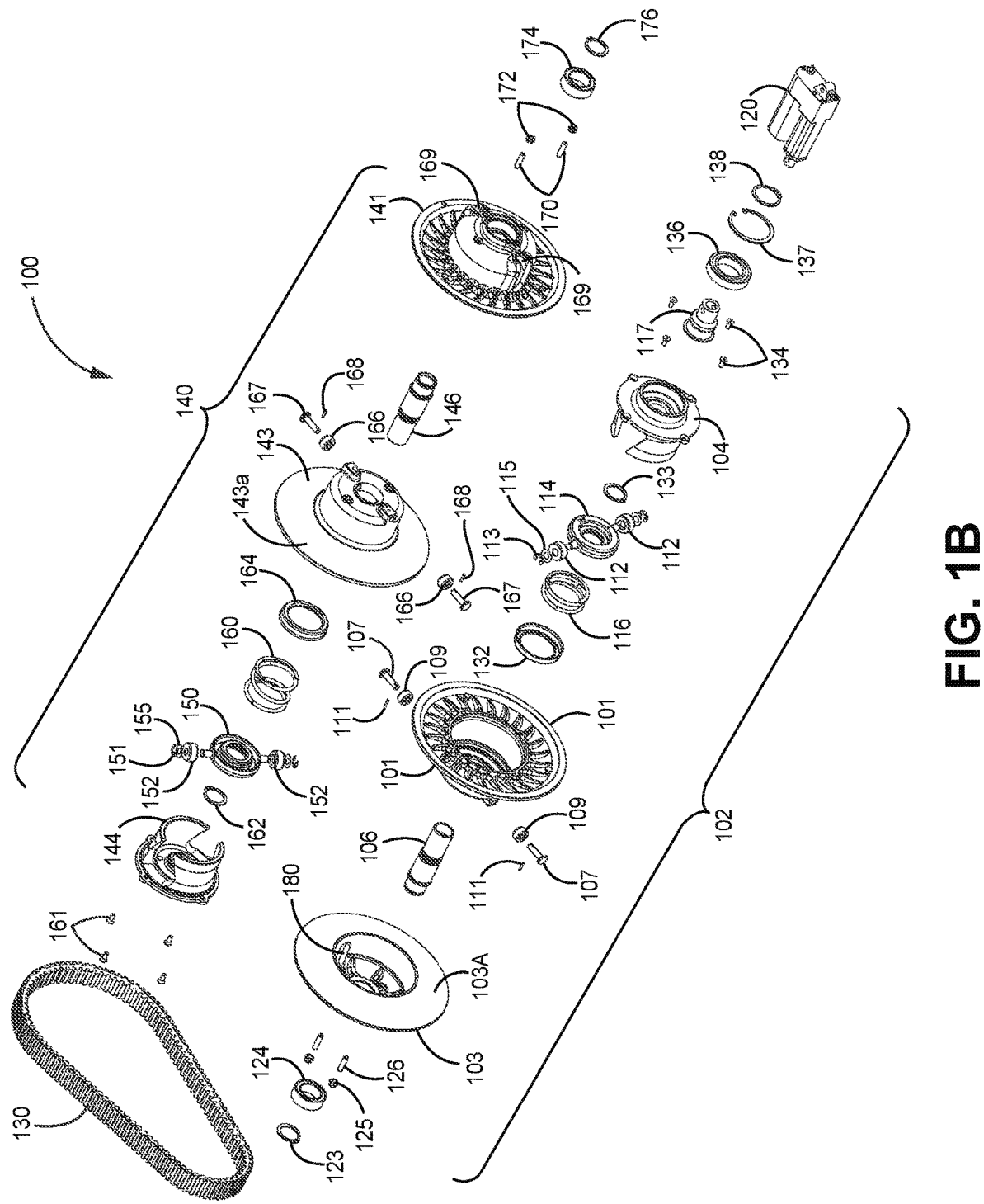
FIG. 1B is an unassembled side perspective view of the UCAS IVT system of FIG. 1A.
Figure 2:
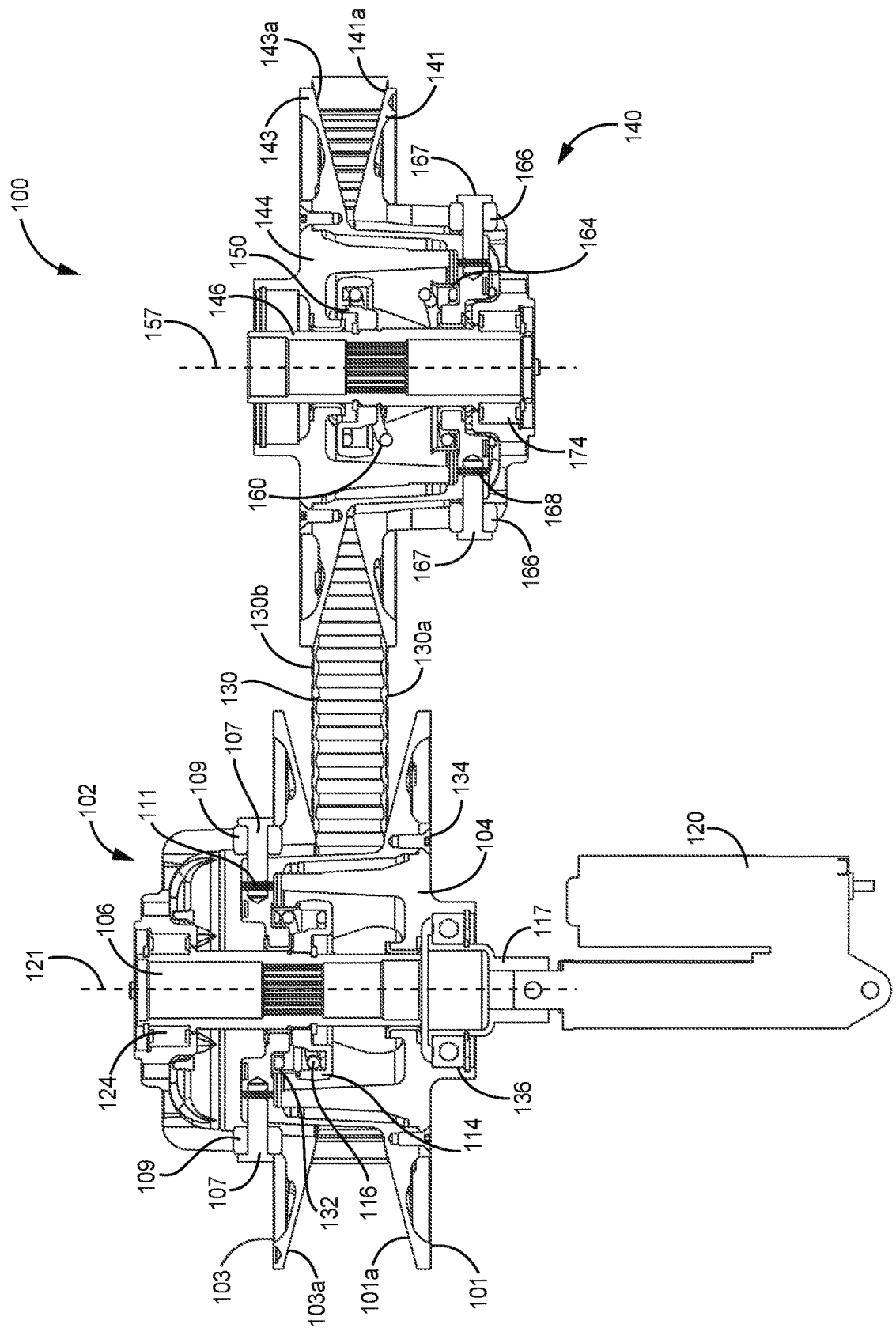
FIG. 2 is a cross-sectional top view of the UCAS IVT system of FIG. 1A in a low ratio configuration.

FIGS. 1A through 3 illustrated one embodiment of a UCAS IVT system 100. In particular, FIG. 1A illustrates a side perspective view UCAS IVT system 100, FIG. 1B illustrates an unassembled side view of the UCAS IVT system 100 and FIG. 2 illustrates a cross-sectional side view of the UCAS IVT system.

UCAS IVT system 100 in this example embodiment, includes a drive clutch 102 and a driven clutch 140 (or variable diameter pulleys or sheaves) that are rotationally coupled to transfer torque via an endless loop member 130. The endless loop member 130 may be, but is not limited to, a belt. Each sheave (or pulley) 102 and 140 includes its own torque sensitive assembly (200 and 240 respectively) discussed further in detail below. The drive clutch 102 is configured to be operationally coupled to a motor (such as motor 502 of FIG. 11) while the driven clutch 140 is configured to be operationally coupled to a drivetrain (or the rest of a drivetrain) of a vehicle (such as vehicle 500 of FIG. 12). The UCAS IVT system 100 further includes an actuator 120 that is operationally coupled to the drive clutch 102. The drive clutch 102 and driven clutch 140 each include a pair of fixed and movable sheave members discussed below that selectively vary the location of the endless loop member 130 in relation to a central axis 121 and 157 (illustrated in FIG. 3) of the respective clutch 102 and 140 to selectively change the gear ratio of the respective clutch 102 and 140. The actuator 120 is used to control the gear ratio of the drive clutch 102 and driven clutch 140 independent of torque forces experienced by the drive clutch 102 and driven clutch 140 in embodiments.

The drive clutch 102 includes a movable drive sheave member 101 and a fixed drive sheave member 103. A drive cam 104 (drive torque sensitive cam) is axially and rotationally fixed (coupled) to the moveable drive sheave member 101. The drive cam 104 is further axially and rotationally free about a central shaft 106 (or drive post 106) of the drive clutch 102. The fixed drive sheave member 103 is coupled to the drive post 106. In one embodiment, the fixed drive sheave member 103 (stationary drive sheave member) is axially fixed but rotationally free about the drive post 106. In another embodiment, in which the fixed drive sheave member 103 is uncoupled from the movable drive sheave member 101, the fixed drive sheave member 103 may be rotationally fixed to the drive post 106. Further in an embodiment where the fixed drive sheave member 103 is rotationally coupled to the moveable drive sheave member 101, tied drive rollers 109 that are mounted on a portion of the moveable drive sheave member 101 via mounting rod 107 and holding pin 111 arrangement are used. The tied drive rollers 109 are received in holding tracks 180 of the fixed drive sheave member 103. The holding tracks 180 associated with the fixed drive sheave member 103 may be straight, angled or curved. This sheave tied configuration example embodiment increases torque sensitivity and aids in forward torque and reverse torque transitions.

The movable drive sheave member 101 of the drive clutch 102 is slidably mounded on the drive post 106 while being rotationally free about the drive shaft 106. The actuator 120 is coupled to an actuator cup 117 in this example. The actuator 120 is configured to selectively push the drive cam 104 to move the movable drive sheave member 101 closer to the fixed drive sheave member 103 to engage the belt 130 (clamp down on the belt) as discussed below.

The drive clutch 102 in this example embodiment, further includes a bearing 124 that is positioned between an end portion of the drive post 106 and an opening in an end hub portion of the fixed drive sheave member 103. A retaining clip 123 positioned within a groove in the drive post retains in part the bearing 124 in a desired location on the drive post 106. Spacer members 125 and 126 are used to establish a pre-set minimum spacing between the fixed drive sheave member 103 and the movable drive sheave member to establish a sheave travel limit at a high ratio condition. The spacer members 125 and 126 are not needed in embodiments that maintain tension across the belt 130 at full low ratio.

A drive torque sensitive assembly 200 of the drive clutch 102 includes the drive cam 104, a drive bias seat member 132, a drive bias member 116 and a drive spider 114. The drive bias seat member 132 is received within a hub portion of the movable drive sheave member 101 around the drive post 106 and is positioned to engage a first end of the drive bias member 116. The drive bias member 116 is a spring in this embodiment. A second end of the drive bias member 116 is positioned to engage a central ring portion of the drive spider 114. The drive bias member 116 provides a select bias force on the drive spider 114 away from an end of the hub portion the movable drive sheave member 101. The drive spider 114 includes arms that extend out in an opposite fashion from the central ring portion. Rotationally mounted on the arms of the drive spider 114 are drive cam rollers 112. They are mounted on the arms via C-clip 113 and washer 115 arrangement in this example embodiment. A retaining clip 133 at least in part prevents axial movement of the drive spider 114 along the drive post 106. Further, a spline arrangement between and inner surface of the central ring portion of the drive spider 114 and the drive post 105 locks rotation of the drive spider 114 with the rotation of the drive post 106.

The drive cam 104 is coupled to the movable drive sheave member 101 via fasteners 134. As discussed above, the actuator cup 117 engages the drive cam 104 and is used by the actuator 120 to selectively move the movable drive sheave member 101 closer to the fixed drive sheave member 103. A bearing 136 is positioned around a portion of the actuator cup 117 and inner portion of the drive cam 104 in this embodiment to allow for rotation to occur between the actuator cup 117 and the drive cam 104. Retaining members 137 and 138 are used in part to retain a location of the bearing 136 in a desired position.

The driven clutch 140 has a similar configuration as the drive clutch 102 including a movable driven sheave member 143 and a fixed driven sheave member 141 that are mounted on a driven post 146. The fixed driven sheave member 141 is axially fixed on the driven post 146 while the moveable driven sheave member 143 is able to axially move on the driven post 146. The movable driven sheave member 143 of the driven clutch 140 is slidably mounded on the driven post 146. In one embodiment the moveable driven sheave member 143 is also rotationally free about the driven post 146.

The driven clutch 140 includes driven torque sensitive assembly 240 that includes a driven cam 144, a driven spider 150, a driven bias member 160 and a driven bias seat member 164. The driven cam 144 (torque sensitive cam) is axially and rotationally fixed (coupled) to the moveable driven sheave member 143 via fasteners 161. The driven cam 144 is further axially and rotationally free about the central driven post 146. The driven bias seat member 164 is received within a hub portion of the movable driven sheave member 143 around the driven post 146 and is positioned to engage a first end of the driven bias member 160. The driven bias member 160 is a spring in this embodiment. A second end of the driven bias member 160 is positioned to engage a central ring portion of the driven spider 150. The driven bias member 160 provides a select bias force on the driven spider 150 away from an end of the hub portion the movable driven sheave member 143. The driven spider 150 includes arms that extend in an opposite fashion from the central ring portion. Rotationally mounted on the arms of the driven spider 150 are driven cam rollers 152. They are mounted on the arms via C-clip 151 and washer 155 arrangement in this example embodiment. A retaining clip 162 at least in part prevents axial movement of the driven spider 150 along the driven post 146. Further, a spline arrangement between and inner surface of the central ring portion of the driven spider 150 and the driven post 146 locks rotation of the driven spider 150 with the rotation of the driven post 146.

Similar to the drive clutch 102 discussed above, the fixed driven sheave member 141 of the driven clutch 140 is axially fixed to the central shaft 146 but rotationally free in an embodiment. In another embodiment, in which the fixed driven sheave member 141 is uncoupled from the movable driven sheave member 143, the fixed driven sheave member 141 is rotationally fixed to the driven post 146. In one embodiment where a fixed driven sheave member 141 is rotationally coupled to the moveable driven sheave member 143, tied rollers 166 that are mounted on a portion of the moveable driven sheave member 141 via mounting rod 167 and retaining pin 168 arrangement are used. The tied rollers 166 are received in respective holding tracks 169 of the fixed driven sheave members 141. Also included in the driven clutch 140 is a bearing 174 that mounted around an end portion of driven post 146 and is positioned to engage a portion of a hub portion of the fixed driven sheave member 141. Bearing 174 is axially fixed in a position on the driven post 146 by at least a retaining member 176. Spacing members 170 and 172 are used to establish a pre-set minimum spacing between the fixed driven sheave member 141 and the movable driven sheave member 143. Spacing members 170 and 172 are only required if the system is configured such that the belt 130 could de-couple completely from clutch 102.

The cross-sectional view of FIG. 2 illustrates the UCAS IVT system 100 in a low ratio. In this configuration, the moveable drive sheave member 101 of the drive clutch 102 is spaced away from the fixed drive sheave member 103 such that the belt 130 is allowed to operate at a small effective diameter about a central axis 121 of the drive clutch 102, on sheave faces 101a and 103a of the respective drive sheave members 101 and 103. The amount of force applied between sheave faces 101a and 103a and belt side faces 130a and 130b varies with the amount of torque being supplied to the drive post 106, and the amount of torque being resisted by the driven clutch 140. With no torque being supplied across the system, the only force supplied to the side faces 130a and 130b of the belt 130 is a result of the drive and driven biasing members 116 and 160 (compression springs) in the respective drive and driven torque sensing assemblies 200 and 240 (discussed below) in each respective drive and driven clutch 102 and 140.

The function of the bias members 116 and 160 is to initiate clamp force between sheave faces 101a and 103a of the drive clutch 102 and belt faces 141a and 143a of the driven clutch 140 until the torque elements (the respective drive and driven torque sensing assemblies 200 and 240) in each sheave 102 and 140 can synchronize and transmit clamp force. In embodiments, it may be desirable to minimize the bias force supplied by the bias members 116 and 160. In one particular application, a bias member (compression spring) may be completely eliminated from the clutch 102 and/or 140 that has the actuator 120 connected to it. Hence although the embodiment of FIG. 2 illustrates the actuator 120 is used to manipulate the toque sensing assembly 200 of the drive clutch 102, an actuator may be applied to a driven clutch 104 in another embodiment.

Figure 3:
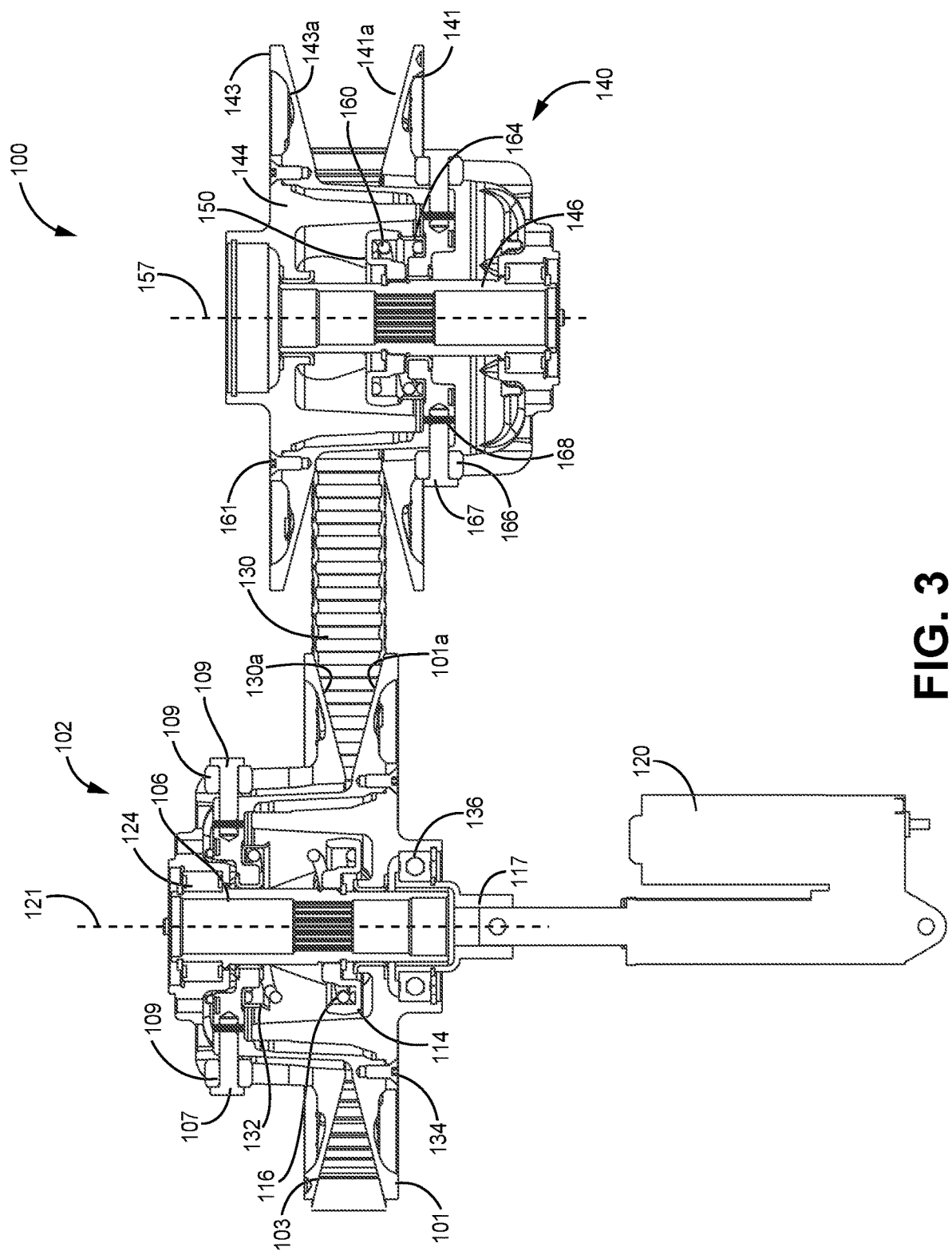
FIG. 3 is a cross-sectional top view of the UCAS IVT system of FIG. 1A in a high ratio configuration.

FIG. 3 illustrates the UCAS IVT system 100 in a high ratio configuration. In a typical drive clutch, the high ratio configuration is achieved by torque forces causing the movable drive sheave member 101 to move closer to the fixed drive sheave member 103 which causing the belt 130 to ride up along the sheave faces 101a and 103a of the respective movable and fixed drive sheave members 101 and 103 such that the belt 130 is positioned farther away from the central axis 121 of the drive clutch 102. In embodiments, torque forces in the UCAS IVT system 100 do not necessarily result in movement of the moveable sheave member of either sheave. The overall goal of this configuration is to balance the clamp loads of the drive and driven clutches 102 and 140 regardless of the moveable sheave member position or effective belt wrap diameter about either sheave (ratio). Sheave movements (shifts) are meant to be controlled by the actuator 120. Some residual shift bias/clamp force bias can be present or even designed into the system to default the UCAS IVT system 100 to a desired position.

Further, there are times when a motor is not providing enough engine torque to the drive post 106 to cause its respective movable sheave member 101 to move towards the fixed sheave member 103 to provide a clamping force on the belt 130. In this situation, there may be a desire to introduce a clamping force on the belt 130 with the drive clutch 102. For example, during an engine braking situation where an associated vehicle is travelling down a steep hill with the motor in idle, coupling torque between the driven clutch 140 and the drive clutch 102 is beneficial to slowing the vehicle down. In an engine braking situation, torque from a drivetrain is greater than the torque provided by the motor. Since embodiments incorporate a dual torque sensing system, at least some of the clamping force is provided by a torque sensing assembly 200 (discussed below) of the drive clutch 102 as the result of torque received from the belt 130.

Figure 4:
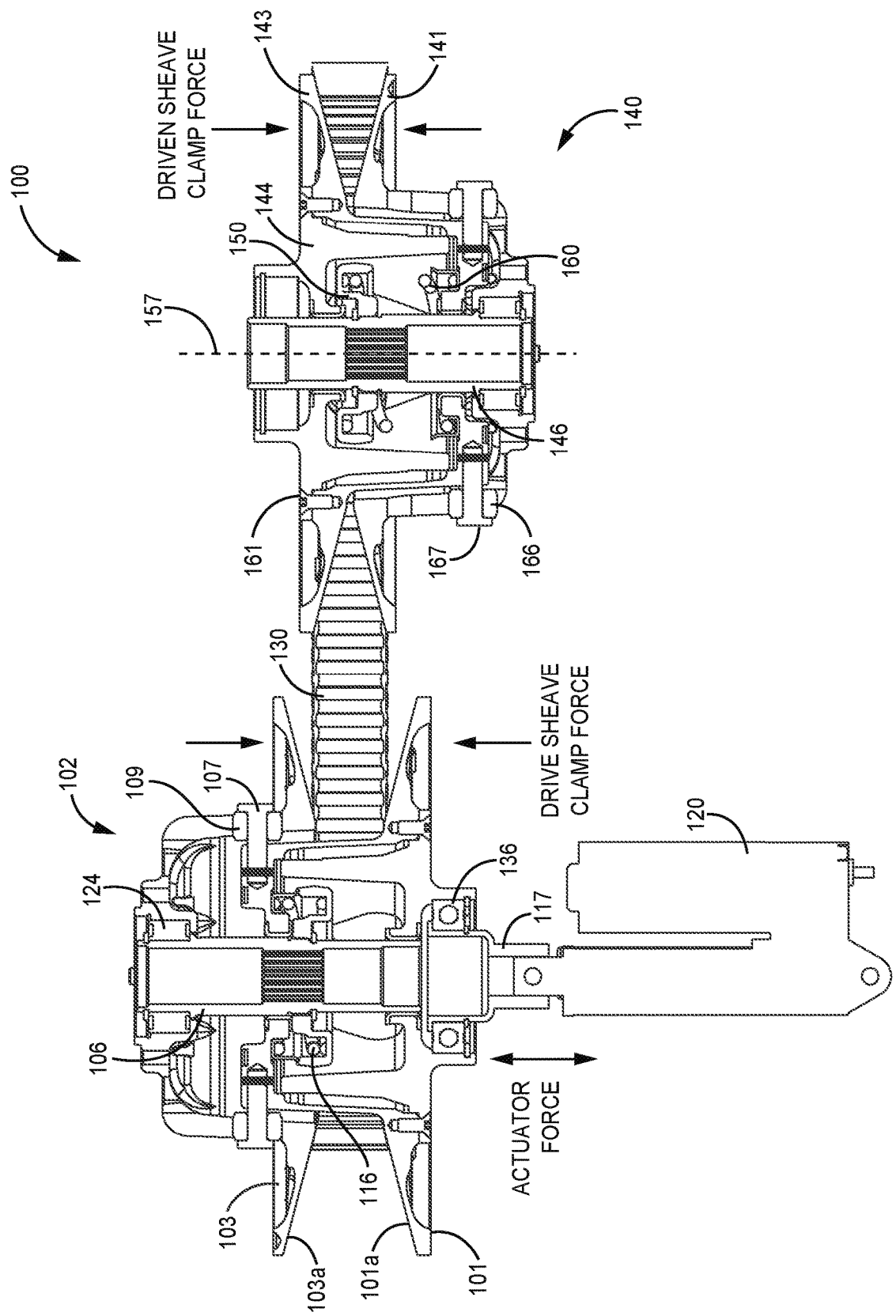
FIG. 4 is a cross-sectional top view of the UCAS IVT system of FIG. 1A in a clamp force configuration.

FIG. 4 illustrates an engine braking situation. The actuator 120 of the UCAS IVT system 100 may be activated to create an activation force to push the movable drive sheave member 101 of the drive clutch 102 towards the fixed drive sheave member 103 to create a drive clutch clamp force on the endless loop member 130. As also illustrated in FIG. 4, a drive clutch clamp force may be further generated as the result of torque received via the belt from the driven clutch 140 once an initial clamp force to establish torque communication between the clutches 102 and 140 is established. Hence in this example embodiment, the clamping force provided by the driven clutch 140 may be added on to the clamping force provided by the actuator 120. This allows the force needed to be supplied by the actuator 120 to be relatively small.

As discussed above, torque forces in the UCAS IVT system of embodiments do not necessarily result in movement of the moveable sheave member of either the drive or driven clutch 102 and 140. The overall goal of this configuration is to balance the clamp loads of the drive and driven clutches 102 and 140 regardless of an associated moveable sheave member position or effective belt wrap diameter about either sheave (ratio). Sheave movements (shifts) are meant to be controlled by the actuator. Some residual shift bias/clamp force bias can be present or even designed into the system to default the UCAS IVT system 100 to a desired position.

Figure 5:
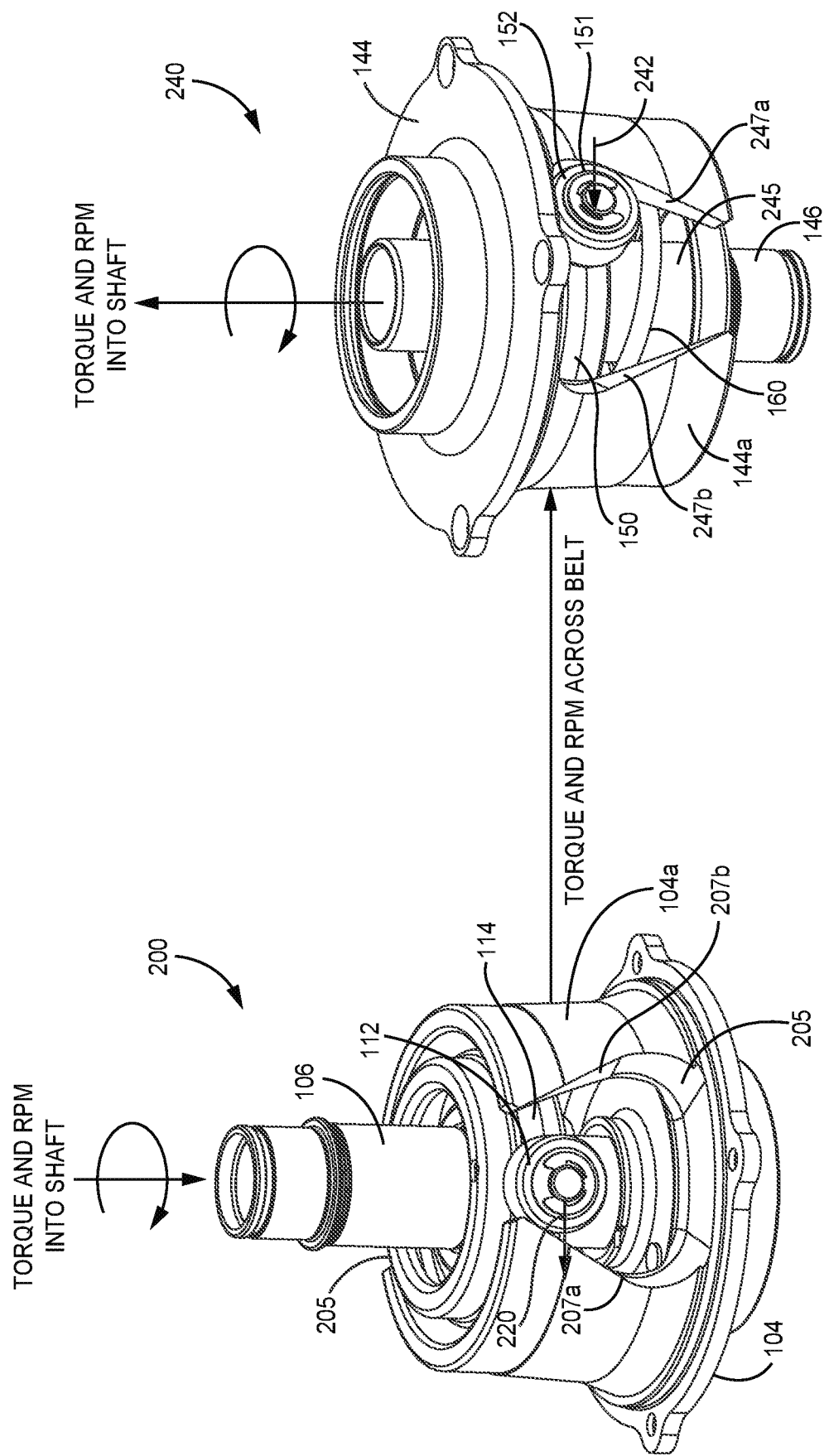
FIG. 5 is a side perspective view of torque sensitive assemblies of the drive clutch and driven clutch in a low ratio configuration according to one exemplary embodiment.

Referring to FIG. 5 an illustration of how the torque sensing assemblies 200 and 240 of the respective drive and driven clutch 102 and 140 work is provided. As illustrated and described above, drive torque sensing assembly 200 of the drive clutch 102 includes drive cam 104. Drive cam 104 includes a cam hub portion 104a with cutout portions 205 that define cam profile surfaces 207a and 207b. The drive cam rollers 112 rotationally mounted on the arms of the drive spider 114 are positioned within respective cutout portions 205 in the drive cam 104 to engage the respective cam profile surfaces 207a and 207b of the drive cam 104. Rotation and torque are input into the cam profile surfaces by the drive cam rollers 112.

Similarly, driven cam 144 of the driven torque sensing assembly 240 of the driven clutch 140 includes a cam hub portion 144a with cutout portions 245 (only one cutout portion is illustrated in FIG. 5) that define cam profile surfaces 247a and 247b. The driven cam rollers 152 of the driven spider 150 engaging the cam profile surfaces 247a and 247b. Rotation and torque are input into the cam profile surfaces by the driven cam rollers 152 of the driven spider 150.

As discussed above, the driven bias member 160 (compression spring) provides an initiation clamp force between the sheave faces and the belt faces to allow the torque sensitive elements to synchronize. The bulk of the clamp load is produced by the torque sensing assemblies 200 and 240. As also discussed above, in some embodiments, both the torque sensing assemblies 200 and 240 include a bias member 116 and 160, while in other embodiments only one of the torque sensing assemblies includes a bias member, as the initiation force can be supplied by an actuator 120 if desired. Hence, in some embodiments, only one compression spring is used in one of the torque sensing assemblies that is not in operational communication with an actuator.

A low ratio configuration where torque and RPMs (rotation) are introduced in the drive post 106 of the drive clutch 102 via motor is illustrated in FIG. 5. Torque and rotation, indicated by arrow 220, are in turn communicated to the cam assembly 104 via the drive cam rollers 112 of the drive spider 110. The torque and rotation are then communicated to the driven cam 144 of the driven torque sensing assembly 240 of the driven clutch 140 via the belt 130. The driven cam 144 in turn communicates the torque and rotation, indicated via arrow 242 to the spider 150 which is coupled to the driven post 146 that delivers the torque and RPM to the drivetrain.

Figure 6:
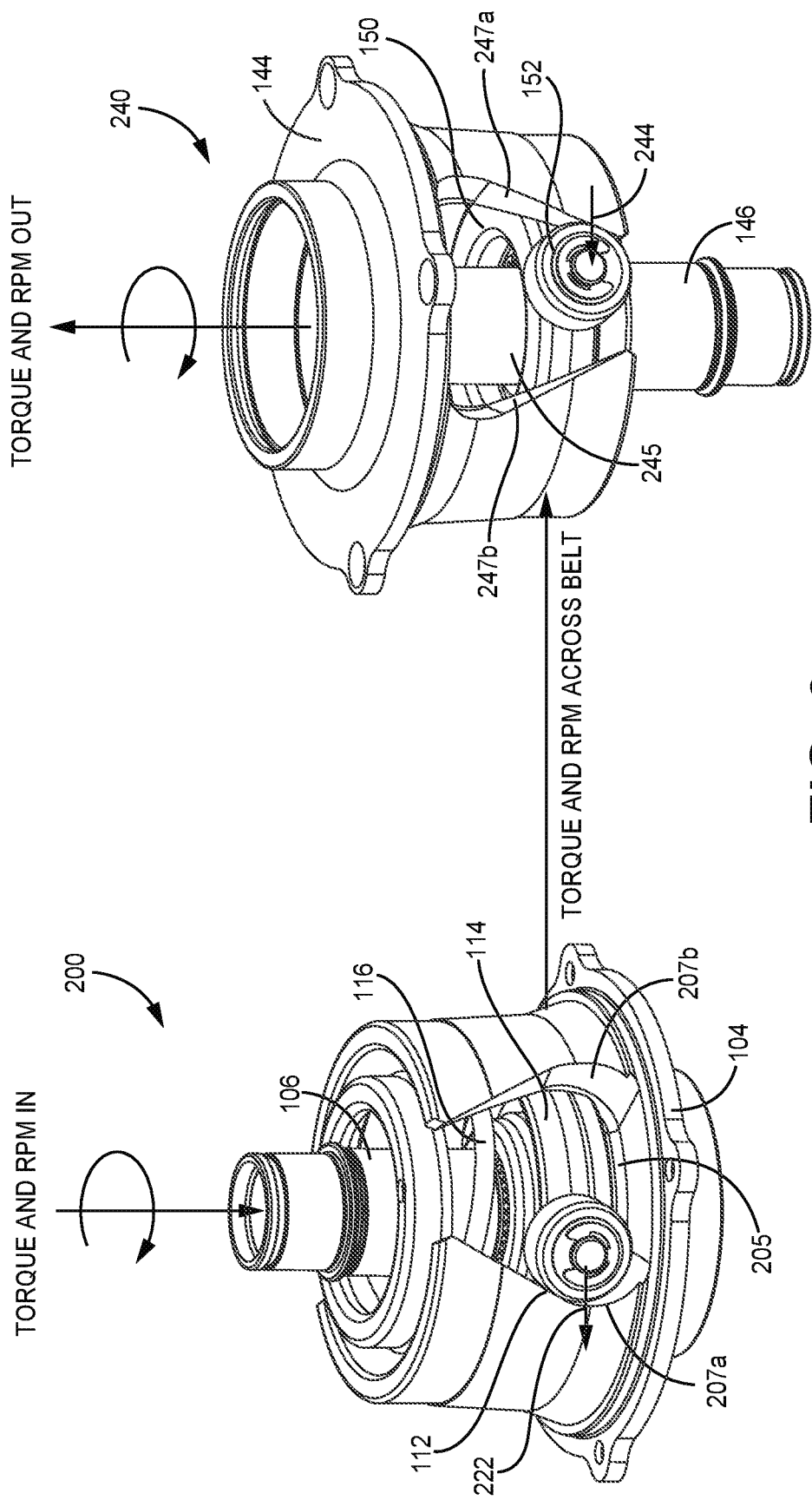
FIG. 6 is side view of the torque sensitive assemblies of the drive clutch and driven clutch in a high ratio configuration according to one exemplary embodiment.

FIG. 6 illustrates a high ratio configuration of the torque sensing assemblies 200 and 240 of the respective drive and driven clutch 102 and 140. As with the low ratio configuration example discussed above, torque and rotation, are introduced in the drive post 106 of the drive clutch 102 via a motor or power source. The torque and rotation, indicated by arrow 222, are in turn communicated to the drive cam 104 via the drive cam rollers 112 of the drive spider 114. In this high ratio configuration, drive cam roller 112 has moved along the cam profile surface 207a. The torque and rotation are then communicated to the driven cam 144 of driven torque sensing assembly 240 of the driven clutch 140 via the endless loop member 130. The driven cam 144 of the driven clutch 140 in turn communicates the torque and rotation, indicated by arrow 244, to the driven spider 150 which is coupled to the driven post 146 of the driven clutch 140 to deliver the torque and rotation to the drivetrain.

In the high ratio configuration of FIG. 6, drive bias member 116 of the drive torque sensing assembly 200 is illustrated. Drive bias member 116 provides a force load that is additive to a clamp load produced by torque cam elements of the drive torque sensing assembly 200. The bias member 116 provides an initiation clamp force between the sheave faces and the belt faces in each clutch to allow the torque sensitive elements to synchronize. However, the bulk of the clamp load may be produced by the torque cam elements of the drive torque sensing assembly 200. As discussed above, only the clutch 102 or 140 that is not in communication with the actuator 120 needs a bias member or compression spring in an embodiment.

Figure 7:
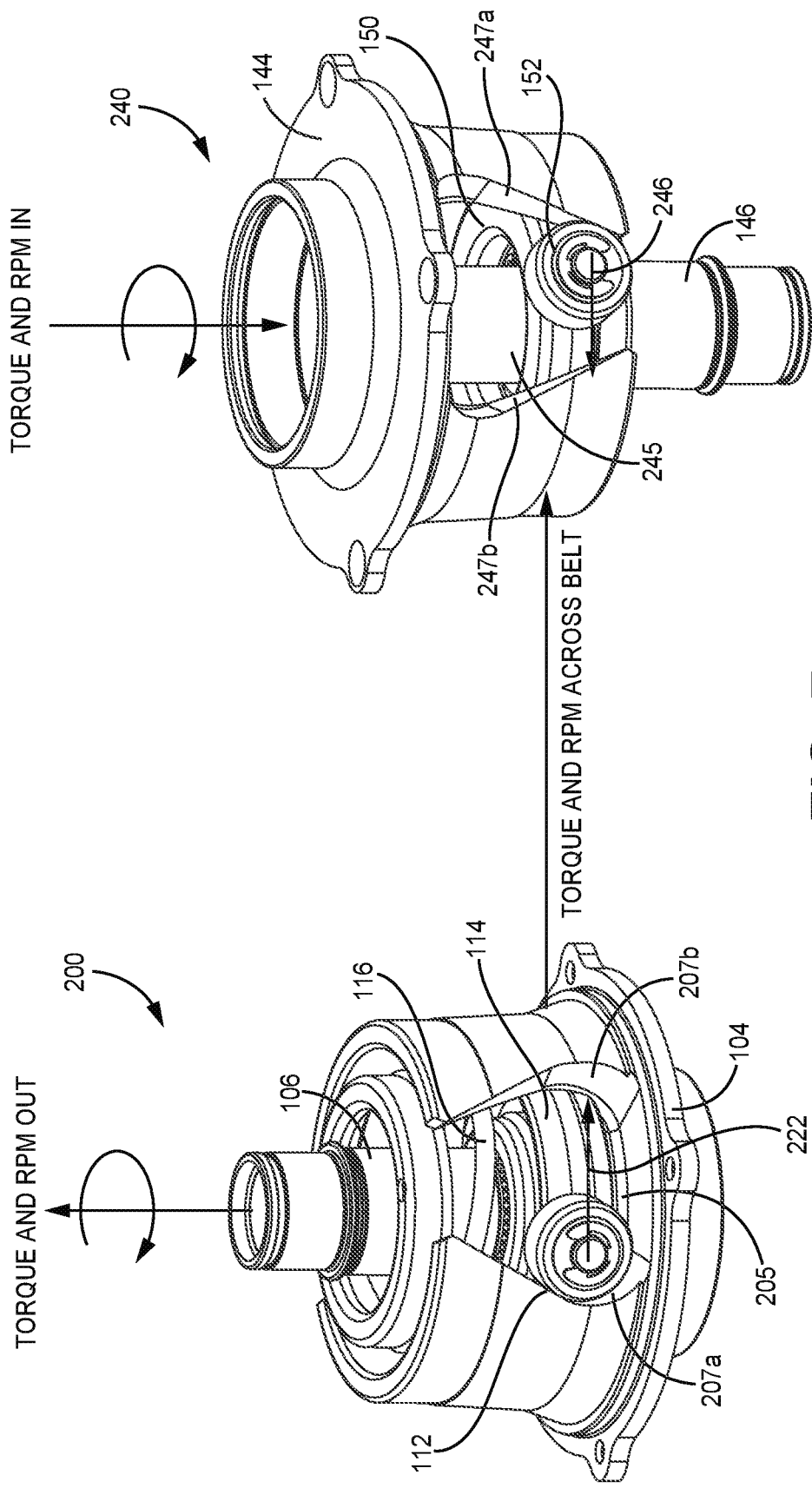
FIG. 7 is side view of the torque sensitive assemblies of the drive clutch and driven clutch in a reverse torque configuration according to one exemplary embodiment.

FIG. 7 illustrates a reverse torque configuration of the torque sensing assemblies 200 and 240 of the respective drive and driven clutches 102 and 140. In this reverse torque configuration, torque and rotation is coming into the driven post 146 of the driven torque sensing assembly 240 of the driven clutch 140 from the drivetrain. For this back-driving to occur, the RPM of the driven post 146 divided by the belt contact diameter of the drive clutch 102 vs driven clutch 140 (CVT ratio) must be greater than the RPM of the drive post 106. As illustrated, the torque and rotation coming into the driven post 146 of the driven clutch 140 causes the driven spider 150 to rotate its arms towards cam profile surface 247*b* causing the driven cam rollers 152 to engage cam profile surface 247*b*. This is indicated by arrow 246. Torque and rotation on the driven cam 144 via driven cam rollers 152 are then communicated to drive cam 104 of the drive torque sensing assembly 200 of the drive clutch 102 via the endless loop member 130. This torque and rotation causes the drive cam 104 to rotate such that the cam profile surface 207*b* will engage the drive cam rollers 112 of spider 114 of drive torque sensing assembly 200. This is indicated by arrow 222. The drive cam roller 112 engaging cam profile surface 107*b* of the drive cam 104 will assert a force on the drive spider 114 and the drive post 106 to rotate as illustrated.

The angled cam profile surfaces 247*a* and 247*b* in each cutout portion 245 of the driven cam 144 of the driven clutch 140 acts against the associated driven cam roller 152 of the driven spider 150 to generate a belt clamp force in the driven clutch 140. The drive and driven torque sensitive assemblies 200 and 240 in the respective drive clutch 102 and the driven clutch 140 generate a variable amount of clamp load in the respective drive clutch 102 and driven clutch 140 based on torque input supplied across the UCAS IVT system 100.

In embodiments the cam angles of the angled cam profile surfaces 207*a*, 207*b*, 247*a* and 247*b* of each respective drive and driven cam 104 and 144 are variable based a corresponding working diameter of the endless loop member 130 (belt). Moreover, the cam angles of the angled cam profile surfaces 207*a*, 207*b*, 247*a* and 247*b* of each cam 104 and 144 are configured to produce equivalent belt clamp load on each of the drive clutch 102 and the driven clutch 140 for all relative belt working diameters/IVT ratios. An effective "shifting force" in embodiments is equivalent in each clutch 102 and 140 for all relative belt working diameters/IVT ratios and torque inputs. Further, to alter the belt running diameter/IVT ratio, a supplemental force must be supplied by an external actuator, such as actuator 120. The actuator 120 may include an electric, hydraulic, pneumatic, magnetic etc. actuation.

Embodiments of the UCAS IVT system 100 are useful in that they employ a simple, elegant means to producing the correct amount of belt clamp load between each clutch assembly 102 and 140 and the belt 130. The required belt clamp load at each clutch 102 and 140 is directly proportional to the amount of torque being carried/transmitted across the sheave (pulley). As torque at each clutch 102 and 140 increases, the torque sensitive element produces more belt clamp load. As torque at each clutch 102 and 140 decreases, the associated torque sensitive assembly 200 and 240 produces less clamp belt clamp load. The torque sensitive assembly 200 and 240 in each clutch 102 and 140 can be tailored to produce precisely the correct amount of belt clamp load. The belt clamp load in each clutch 102 and 140 remains at an optimum level for any amount of torque being transmitted by the sheave/belt. In addition, heat generated by the belt/sheave member interface remains as low as possible due to optimum belt clamp loads. The belt clamp loads in each clutch 102 and 140 can be tailored to produce a net zero, or balanced level of shifting force. For any belt running diameter combination and level of torque being transmitted, neither clutch 102 or 140 will necessarily have a tendency to overpower the other to force a change in belt running diameter on either clutch 102 or 140. Required belt clamp to transmit power at each clutch 102 and 140 is produced by the associated torque sensitive assemblies 200 and 240. If an actuator 120 (electronic, hydraulic, pneumatic, magnetic) is used to facilitate the shifting function (change in belt running diameter in either pulley), the force required by the actuator 120 is greatly reduced. If RPM sensitive (centrifugal) elements, for example fly weights, are used to facilitate the shifting function, the size of those elements can be greatly reduced.

Figure 8:
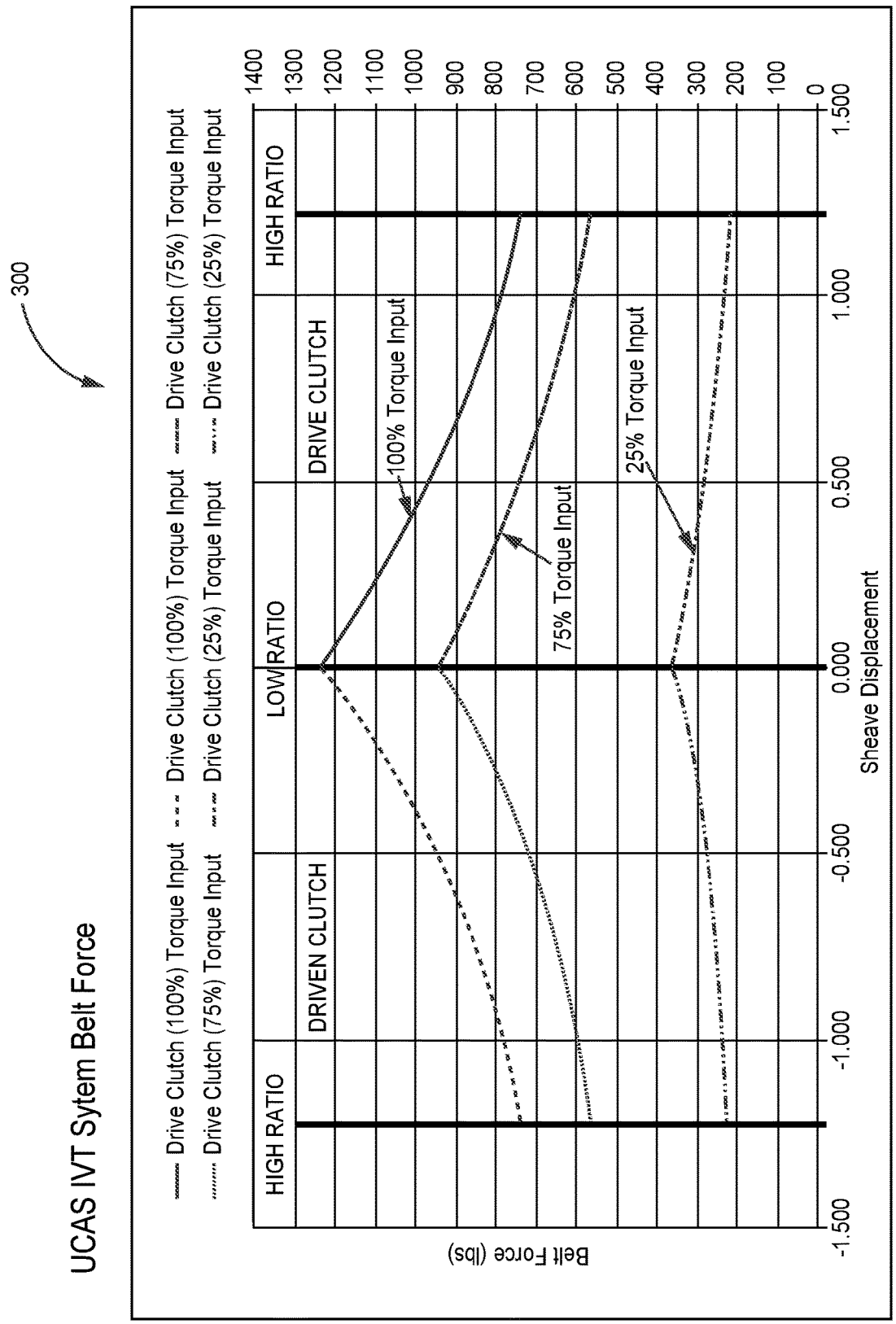
FIG. 8 is a UCAS IVT system belt force graph according to one exemplary embodiment.

Referring to FIG. 8, a UCAS IVT system force graph 300 is illustrated. The graph 300 illustrates the sheave displacement for the driven clutch 140 and the drive clutch 102 for a given belt force in an example embodiment.

In another embodiment, the IVT bulk clamp load is accomplished mechanically using a predetermined configuration of RPM sensitive elements (such as but not limited to flyweights) in the drive clutch and torque sensitive elements in the driven clutch. Clamp load resulting from the RPM sensitive elements in the drive clutch resists clamp load resulting from the torque sensitive elements in the driven clutch. In an embodiment of dual torque sensitivity in the drive clutch and driven clutch, the driven clutch may be configured to bias to low ratio (where a driven clutch clamp force is greater than a drive clutch clamp force for any amount of torque transmitted across the IVT). In still another embodiment, torque sensitive elements in a drive clutch are used to reduce the clamp requirement from the RPM sensitive elements. This embodiment allows for the size of the RPM sensitive elements to be reduced, the radial placement of the RPM sensitive elements to be reduced and the overall packaging requirement for the RPM sensitive elements to be reduced.

Figure 9:
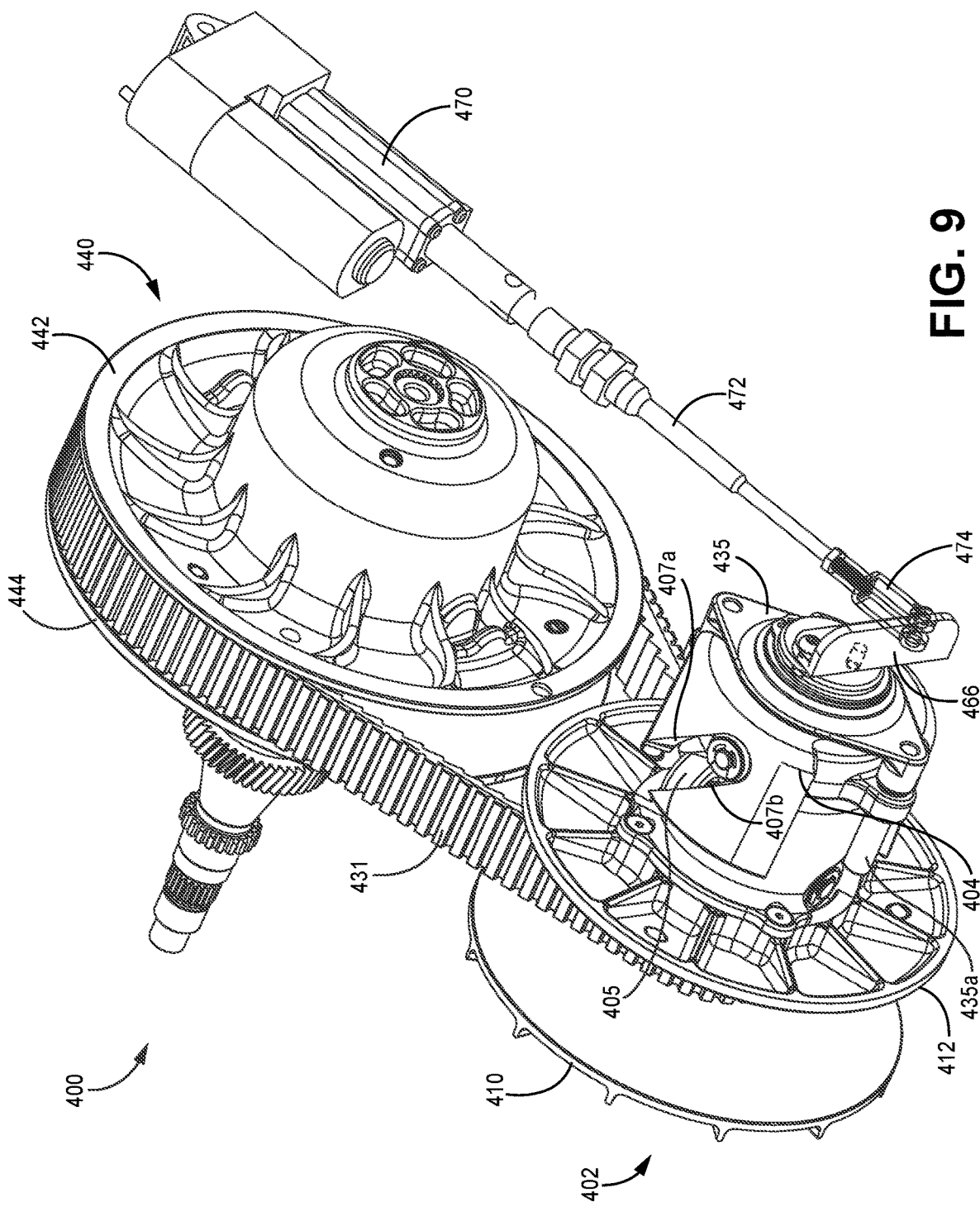
FIG. 9 is a side perspective view of another UCAS IVT system according to one exemplary embodiment.
Figure 10:
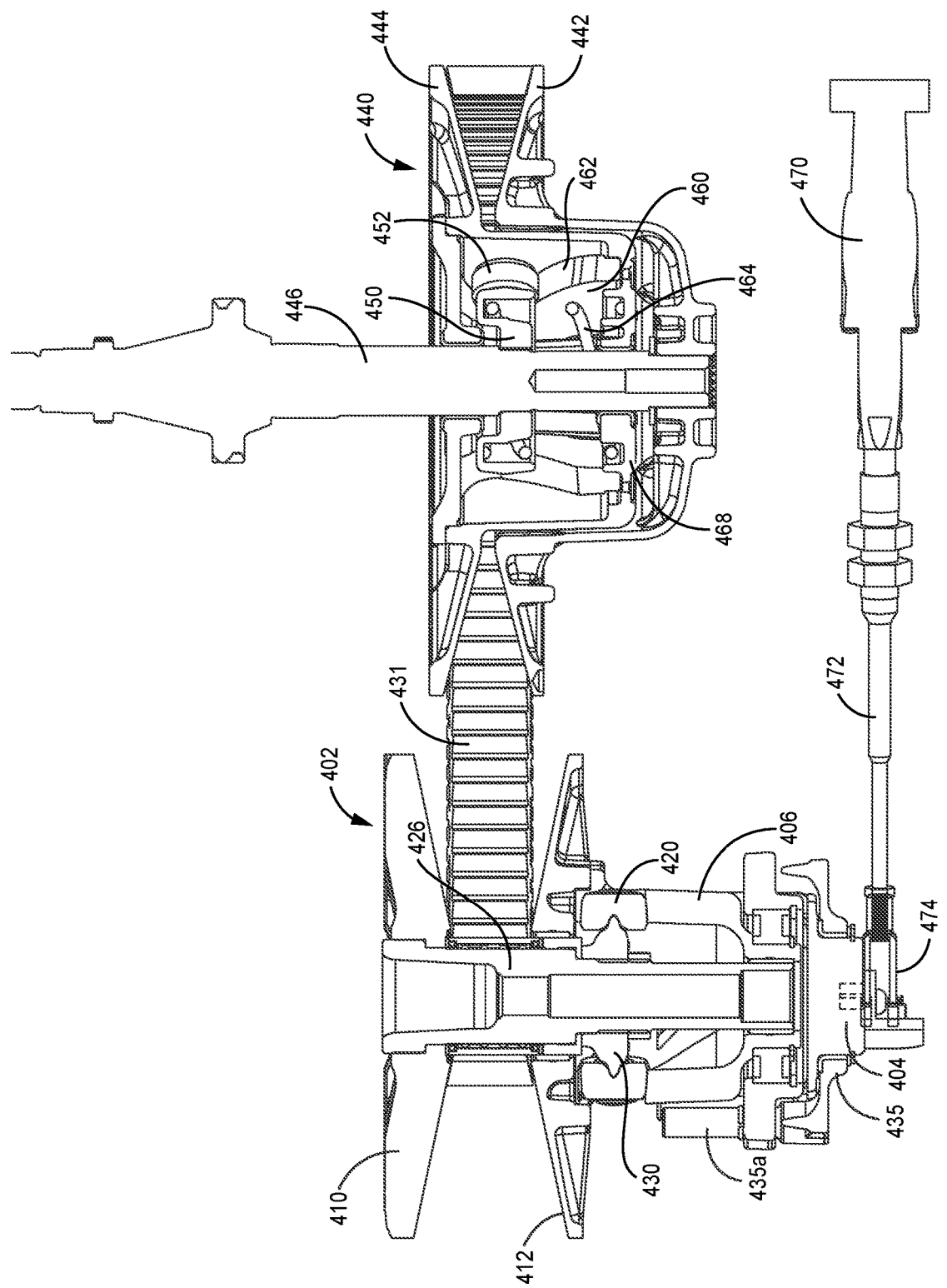
FIG. 10 is a cross-sectional top view of the UCAS IVT system of FIG. 9.
Figure 11:
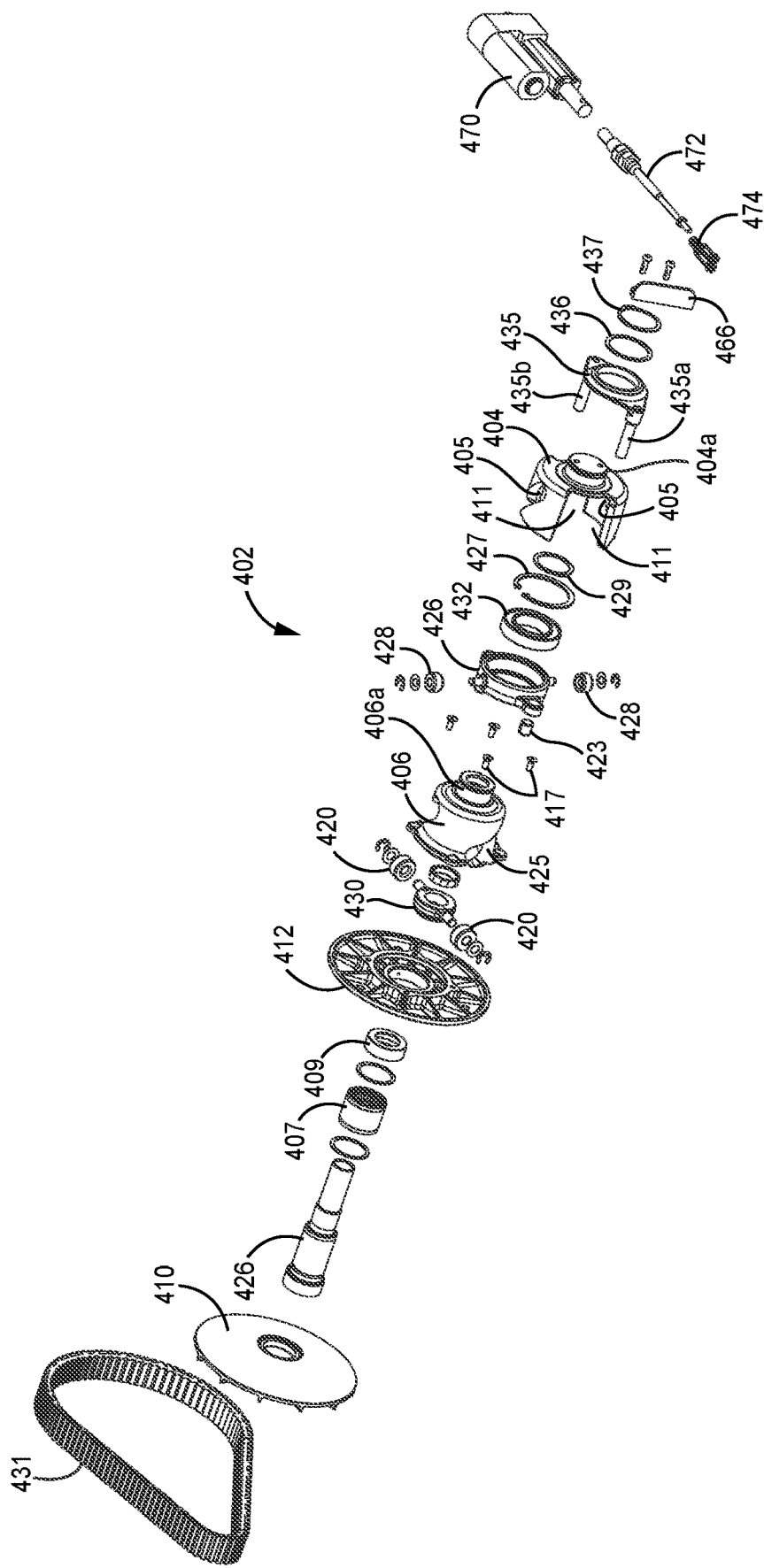
FIG. 11 is an unassembled side perspective view of a drive clutch of UCAS IVT system of FIG. 9.

FIGS. 9 through 11 illustrates another embodiment of a UCAS IVT 400. In particular, FIG. 9 illustrates a side perspective view of the UCAS IVT 400 and FIG. 10 illustrates a cross sectional top view of the UCAS IVT 400. FIG. 11 further illustrates an unassembled side view of the drive clutch 402 of UCAS IVT 400. Similar to the UCAS IVT 100 discussed above, UCAS IVT 400 includes a drive clutch 402 and a driven clutch 440 that are in operational communication to transfer torque and rotation via endless loop member such as a belt 431.

The driven clutch 440 includes a fixed driven sheave member 442 that is mounted on a driven post 446 in an axially and rotationally fixed connection. A movable driven sheave member 444 is slidable mounted on the driven post 446. As with the embodiments described above, the driven clutch 440 further includes a driven torque sensitive assembly that includes a driven cam 460 and driven spider 450 arrangement. Driven cam rollers 452 mounted on arms of the driven spider 450 engage angled cam profile surfaces 462 formed in the driven cam 460 similar to the embodiments discussed above. The driven spider 450 is rotationally locked to the rotation of the drive post 433. The driven torque sensitive assembly further includes a bias member 464 (compression spring) similar to bias member described in the above embodiments.

The drive clutch 402 includes a fixed drive sheave member 410 that is mounted on a drive post 433 in an axially and rotationally fixed connection. A movable drive sheave member 412 is slidable mounted on the drive post 433. Mounted on the drive post 433 between the fixed drive sheave member 410 and the movable drive sheave member 412 is idler bearing 407. Positioned between the movable drive sheave member 412 and the drive post 433 is a spacer 409 that allows the movable drive sheave member 412 to slide axially out of contact with the idler bearing 407. The spacer 409 is seated against a shoulder of the drive post 433 via drive spider 430 with a jam nut 421.

The moveable drive sheave member 412 in this embodiment includes two cam assemblies. The first cam assembly is part of a drive torque sensitive assembly that works similar to the torque sensitive assemblies described above. This drive torque sensitive assembly includes the drive spider 430 and drive cam 406. The drive spider 430 is rotationally fixed to the drive post 433. Rollers 420 are rotationally coupled to ends of arms of the drive spider 430 and are positioned within cutout sections 425 of drive cam 406. As with the embodiments described above, the rollers 420 of the drive spider 430 selectively engage angled cam profile surfaces of the cutout sections 425 of the drive cam to transfer torque and rotation. The drive cam 406 is coupled to the movable drive sheave member 412 via fasteners 417.

The second cam assembly is part of an activation system to selectively move the moveable drive sheave member 412 independent from the drive torque sensitive assembly. The activation assembly includes an activation cam 404. The activation cam 404 has cutout sections 411 or portions and roller guide cutout sections 405. Rollers 428, that are rotationally mounted on arms of an activation spider 426, are positioned within the roller guide cutout sections 405 of the activation cam 404. A bearing 432 is positioned between a post extending end portion 406a of the drive cam 404 and the activation spider 426 to allow the activation spider to rotate in relation to the drive cam 404. The bearing 432 and activation spider 426 are retained on the post extending end portion 406a of the drive cam 406 via retaining member 427 and 429.

A spider guide 435 with extending spider guide arms 435a and 435b is locked rotationally and axially to a chassis (not shown) with fasteners. A central portion of the spider guide 435 is mounted on a post extending end portion 404a of the activation cam 404 via retaining members 436 and 437. The spider guide arms 435a and 435b are received in the cutout sections 411 of the activation cam 404 to reach the activation spider 426. Sleeve bushings 423 in passages in the activation spider 426 receive ends of the spider guide arms 435a and 435b. The spider guide 435 prevents the actuator spider 427 from rotating as the actuator cam 404 pivots (rotates) due to actuator 470 travel. The actuator spider 426 is limited to axial travel only and transmits axial force (originating from the actuator 470) to the activation cam 404 (which is rotating at a high speed) via bearing 432. Axial travel of the actuator spider 426 is communicated to the movable drive sheave member 412.

As discussed, the torque sensitive assemblies in the drive and driven clutch 402 and 440 work similar to torque sensitive assemblies 200 and 240 described above. In this embodiment of the UCAS IVT 400, however, a different activation arrangement is used in the drive clutch 402. The activation arrangement includes the actuator 470 and the activation cam 404 arrangement. An activation elongated member 472 with an attachment member 474 is operationally coupled to the actuator 470. The attachment member 474 is pivotally coupled to an activation bracket 466. Activation bracket 466 is connected to the actuation cam 404 that pivots relative to the actuation cam spider 426 to convert rotational torque from the actuation cam 404 to linear force at the actuation spider 426, and ultimately the moveable drive sheave member 412 of drive clutch 402. Rotational movement of the activation bracket 466 via the actuator 470 rotates the actuation cam 404. The cam rollers 428 of the activation spider 426 ride in the angled roller guide cutout sections 405 of the actuation cam 404 as the actuator 470 rotates the actuation cam 404. Rotation of the activation cam 404 axially moves the actuation spider 426 and actuator bearing 432. Since the movable drive sheave member 412 is in operational communication with the activation spider 426 via drive cam 406, axial movement of the activation spider 426 axially moves the movable drive sheave member 412. Hence, in this embodiment, rotation of the actuation cam 404 via the actuator 470 is used achieve a desired, supplemental clamp pressure on the belt 431 at the drive clutch 402 in addition to bulk clamp forces generated by torque loads across drive cam 406 and drive spider 430.

As illustrated above, an actuator may be operationally coupled to its associated sheave in a direct or indirect connection configuration. In an indirect connection configuration, an intermediate mechanical system between the actuator and associated sheave can be employed to achieve a desirable mounting location of the actuator, to convert a linier actuator motion to a rotational motion or vice-versa, and to employ a mechanical advantage (force multiplier) between the actuator and associated sheave.

As discussed above, in some embodiments, the actuator may be coupled to either the drive or driven clutch. In an embodiment where one of the drive clutch or driven clutch does not have an associated actuator, a bias member (compression spring) is used to initiate a belt clamp load. In embodiments that include actuators for both the drive and driven clutches bias members may not be included.

In embodiments, a bulk clamp load (minimum clamp load required to transmit power only—no shifting and no actuator load) across either sheave via the belt can be achieved by one or more of torque sensitive elements, RPM sensitive elements and bias/spring elements. Further, embodiments allow for the bulk clamp load in each clutch across the UCAS IVT to be balanced (bulk drive clutch clamp=bulk driven clutch clamp) or biased compared to the other clutch (bulk drive clutch clamp<bulk driven clutch clamp or bulk drive clutch clamp>bulk driven clutch clamp).

Figure 12:
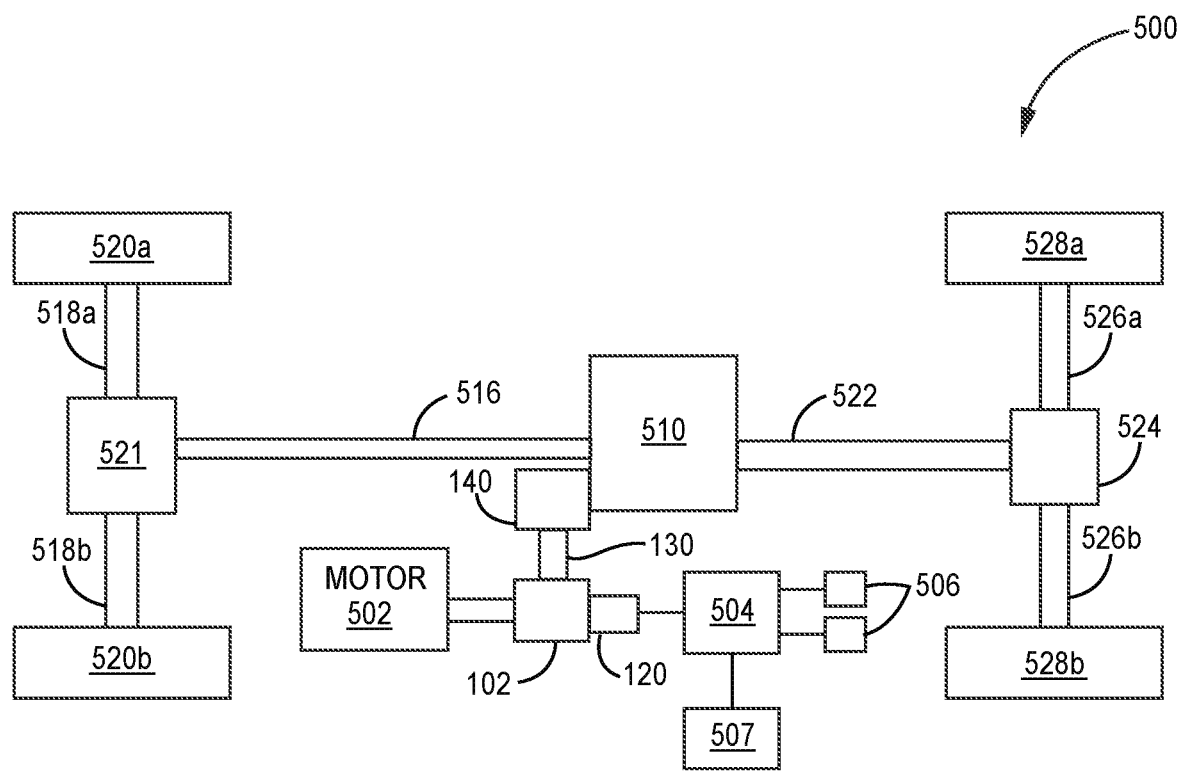
FIG. 12 is a block diagram of a vehicle incorporating a UCAS IVT system according to one exemplary embodiment.

Referring to FIG. 12 a vehicle 500 that implements a UCAS IVT of an example embodiment is illustrated. The vehicle is illustrated as including a motor 502 that provides engine torque and rotation. A drive post of a drive clutch 102 of the UCAS IVT is operationally coupled to the motor 502.

A belt 130 communicates torque and rotation between the drive clutch and the driven clutch 140. The driven clutch 140 includes a driven post that is operationally coupled to communicate torque and rotation to the drivetrain. The drivetrain in this example includes a transmission 510, rear prop shaft 522, a rear differential 524, rear half shafts 526a and 526b and wheels 528a and 528b. The drivetrain, in this example further includes a front prop shaft 516, a front differential 521, front half shafts 518a and 518b and front wheels 520a and 520b.

The actuator 120 controls the drive clutch 102 to achieve ratio change across system 100 or 400 as described above. A controller 504 controls the actuator 120 based on operation instruction stored in a memory and sensor information received by sensors 506. The sensors 506 may include motor sensors, transmission sensors, brake sensors, gear selection sensors, throttle position sensor, ground speed sensors, inclination sensors, temperature sensors, suspension travel sensors, etc.

In general, the controller 504 may include any one or more of a processor, microprocessor, a digital signal processor (DSP), an application specific integrated circuit (ASIC), a field program gate array (FPGA), or equivalent discrete or integrated logic circuitry. In some example embodiments, controller 504 may include multiple components, such as any combination of one or more microprocessors, one or more controllers, one or more DSPs, one or more ASICs, one or more FPGAs, as well as other discrete or integrated logic circuitry. The functions attributed to the controller 504 herein may be embodied as software, firmware, hardware or any combination thereof. The controller 504 may be part of a system controller, such as an engine control unit or transmission control unit, or a component controller. The memory may include computer-readable operating instructions that, when executed by the controller provides functions of the UCAS IVT system. The computer readable instructions may be encoded within the memory 507. Memory 507 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

EXAMPLE EMBODIMENTS

Example 1 includes a UCAS IVT system that includes a drive clutch and a driven clutch. The drive clutch included a drive post, a movable drive sheave member, a fixed drive sheave member and a drive torque sensitive assembly. The drive post is operationally coupled to a motor. The movable drive sheave member is slidably mounted on the drive post. The fixed drive sheave member is mounted in an axially fixed configuration on the drive post. The drive torque sensitive assembly is in operational communication with the movable drive sheave member. The drive torque sensitive assembly is configured to move the movable drive sheave member in relation to the fixed drive sheave member based at least on torque applied to the drive torque sensitive assembly. The drive clutch and driven clutch are configured to communicate torque and rotation between each other with an endless loop member. The driven clutch includes a driven post, a movable driven sheave member, a fixed driven sheave member and a driven torque sensitive assembly. The driven post is operationally coupled to a drivetrain. The movable driven sheave member is slidably mounted on the driven post. The fixed driven sheave member is mounted in an axially fixed configuration on the driven post. The driven torque sensitive assembly is in operational communication with the movable driven sheave member. The driven torque sensitive assembly is configured to move the movable driven sheave member in relation to the fixed driven sheave member based at least on torque applied to the driven torque sensitive assembly.

Example 2 includes the UCAS IVT system of example 1, further including at least one actuator that is operationally coupled to one of the drive clutch and driven clutch to selectively move one of the movable drive sheave member and the movable driven sheave member independent of the respective drive torque sensing assembly and driven torque assembly to achieve at least one of uniform clamping of the endless loop member and a ratio change across the system.

Example 3 includes the UCAS IVT system of Example 2, wherein at least one of the drive clutch and driven clutch further includes an activation spider and an activation cam. The activation spider includes activation rollers. The activation spider is configured to move axially. The activation cam has roller guide cutout sections. The activation rollers are received within the roller guide cutout sections of the activation cam. The actuator is operationally coupled to the activation cam to selectively rotate the activation cam to cause the activation spider to move an associated one of the movable drive sheave member and moveable driven sheave member independent of an associated one of a respective drive torque sensing assembly and driven torque assembly.

Example 4 includes the UCAS IVT system of Example 3, further including an activation elongated member, an attachment member and an activation bracket. The activation elongated member is operationally coupled to the actuator. The attachment member is operationally coupled to an end of the activation elongated member. The activation bracket operationally coupled to the activation cam. The attachment member is pivotally coupled to the activation bracket.

Example 5 includes the UCAS IVT system of Example 2, wherein the at least one actuator is configured to push one of the movable drive sheave member and the movable driven sheave member to achieve uniform clamping of the endless loop member.

Example 6 includes the UCAS IVT system of Example 2, further including at least one sensor, at least one memory and at least one controller. The at least one sensor is used to generate sensor information. The at least one memory is used to store at least operating instructions. The controller is configured to control the actuator based on the stored operating instructions and the sensor information.

Example 7 includes the UCAS IVT system of any of the Examples 1-6, wherein the drive torque sensitive assembly further includes a drive spider, a drive cam roller and a drive cam. The drive spider is coupled to the drive post. Rotation of the drive spider is fixed to the rotation of the drive post. The drive spider includes at least one drive spider arm. A drive cam roller is rotatably coupled on each drive spider arm. The drive cam is coupled to the movable drive sheave member. The drive cam has at least one cutout portion that forms drive cam profile surfaces. Each drive cam roller is positioned within a cutout portion of the at least one cutout portion. Each drive cam roller is configured to engage associated drive cam profile surfaces to communicate torque and rotation between the drive spider and drive cam.

Example 8 includes the UCAS IVT system of any of the Examples 1-7, wherein the drive torque sensitive assembly further includes a drive bias member that is configured to assert a select bias force on the movable drive sheave member to initiate a clamp force on the endless loop member.

Example 9 includes the UCAS IVT system of any of the Examples 1-8, wherein the driven torque sensitive assembly includes a driven spider, a driven cam roller and driven cam. The driven spider is coupled to the driven post. Rotation of the driven spider is fixed to the rotation of the driven post. The driven spider includes at least one driven spider arm. The driven cam roller is rotatably coupled on each driven spider arm. The driven cam is coupled to the movable driven sheave member. The driven cam has at least one cutout portion that forms driven cam profile surfaces. Each driven cam roller is positioned within a cutout portion of the at least one cutout portion. Each driven cam roller is configured to engage associated driven cam profile surfaces to communicate torque and rotation between the driven spider and driven cam.

Example 10 includes the UCAS IVT system of any of the Examples 1-9, wherein the driven torque sensitive assembly further includes a driven bias member configured to assert a select bias force on the movable driven sheave member to initiate a clamp force on the endless loop member.

Example 11 includes a clutch assembly for a uniform clamp actuated shift infinitely variable transmission system. The clutch assembly includes a clutch, a post, movable sheave member, a fixed sheave member, a torque sensitive assembly and an actuator. The movable sheave member is slidably mounted on the post. The fixed sheave member is mounted in an axially fixed configuration on the post. The torque sensitive assembly is in operational communication with the movable sheave member. The torque sensitive assembly is configured to move the movable drive sheave member in relation to the fixed sheave member based on torque applied to the drive torque sensitive assembly. The actuator is operationally coupled the movable sheave member to selectively move the movable sheave member independent of the drive torque sensing assembly.

Example 12 includes the clutch assembly of Example 11, wherein the clutch is a drive clutch and further wherein the post is configured to be in operational communication with a motor. The movable sheave member and fixed sheave member are configured to be in operational communication with an endless loop member.

Example 13 includes the clutch assembly of Example 11, wherein the clutch is a driven clutch and further wherein the post is configured to be in operational communication with a drivetrain. The movable sheave member and fixed sheave member are configured to be in operational communication with an endless loop member.

Example 14 includes the clutch assembly any of the Examples 11-13, wherein the torque sensitive assembly further includes a spider, cam rollers and a cam. The spider is coupled to the post. Rotation of the spider is fixed to the rotation of the post. The spider includes at least one arm. A cam roller is rotatably coupled on each arm. The cam is coupled to the movable sheave member. The cam has at least one cutout portion that forms cam profile surfaces. Each cam roller is positioned within a cutout portion of the at least one cutout portion. Each cam roller is configured to engage an associated cam profile surfaces to communicate torque and rotation between the spider and cam.

Example 15 includes the clutch assembly of Example 11, further including an activation spider and an activation cam. The activation spider includes activation rollers. The activation spider is configured to move axially. The activation cam has roller guide cutout sections. The activation rollers are received within the roller guide cutout sections of the activation cam. The actuator is operationally coupled to the activation cam to selectively rotate the activation cam to cause the activation spider to move the movable sheave member independent of the torque sensing assembly.

Example 16 includes the clutch assembly of Example 15, including an activation elongated member, an attachment member and an activation bracket. The activation elongated member is operationally coupled to the actuator. The attachment member is operationally coupled to an end of the activation elongated member. The activation bracket is operationally coupled to the activation cam. The attachment member is pivotally coupled to the activation bracket.

Example 17 includes the clutch assembly of any of the Examples 11-14, wherein the at least one actuator is configured to push the movable sheave member to move the movable sheave member.

Example 18 includes a vehicle having a uniform clamp actuated shift infinitely variable transmission (UCAS IVT) system. The vehicle includes a motor, a drivetrain and the UCAS IVT system. The motor is used to generate engine torque and rotation. The UCAS IVT system includes an endless loop member, drive clutch, a driven clutch and at least one actuator. The drive clutch includes a drive post, a movable drive sheave member, a fixed drive sheave member and a drive torque sensitive assembly. The drive post is operationally coupled to the motor. The movable drive sheave member is slidably mounted on the drive post. The fixed drive sheave member is mounted in an axially fixed configuration on the drive post. The drive torque sensitive assembly is in operational communication with the movable drive sheave member. The drive torque sensitive assembly is configured to move the movable drive sheave member in relation to the fixed drive sheave member based at least in part on torque applied to the drive torque sensitive assembly. The drive clutch and driven clutch are configured to communicate torque and rotation between each other with the endless loop member. The driven clutch includes a driven post, a movable driven sheave member, a fixed driven sheave member and a driven torque sensitive assembly. The driven post is operationally coupled to the drivetrain. The movable driven sheave member is slidably mounted on the driven post. The fixed driven sheave member is mounted in an axially fixed configuration on the driven post. The driven torque sensitive assembly is in operational communication with the movable driven sheave member. The driven torque sensitive assembly is configured to move the movable driven sheave member in relation to the fixed driven sheave member based on torque applied to the driven torque sensitive assembly. The at least one actuator is operationally coupled to one of the drive clutch and driven clutch to selectively move one of the movable drive sheave member and the movable driven sheave member independent of the respective drive torque sensing assembly and driven torque assembly to achieve at least one of uniform clamping of the endless loop member and to produce a ratio change across the UCAS IVT system.

Example 19 includes the vehicle of Example 18, further including at least one sensor, at least one memory and a controller. The at least one sensor is used to generate sensor information. The at least one memory is used to store at least operating instructions. The controller is configured to control the actuator based on the stored operating instructions and the sensor information.

Example 20 includes the vehicle of any of the Examples 17-19, wherein the at least one actuator is configured to push one of the movable drive sheave member and the movable driven sheave member to selectively move the one of the movable drive sheave member and driven sheave member.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A uniform clamp actuated shift infinitely variable transmission (UCAS IVT) system, the UCAS IVT system comprising:
a drive clutch including,
a drive post operationally coupled to a motor,
a movable drive sheave member slidably mounted on the drive post,
a fixed drive sheave member mounted in an axially fixed configuration on the drive post, and
a drive sensitive assembly in operational communication with the movable drive sheave member, the drive sensitive assembly configured to move the movable drive sheave member in relation to the fixed drive sheave member based at least on one of torque and RPM applied to the drive sensitive assembly;
a driven clutch, the drive clutch and driven clutch are configured to communicate torque and rotation between each other with an endless loop member, the driven clutch including,
a driven post operationally coupled to a drivetrain,
a movable driven sheave member slidably mounted on the driven post,
a fixed driven sheave member mounted in an axially fixed configuration on the driven post, and
a driven torque sensitive assembly in operational communication with the movable driven sheave member, the driven torque sensitive assembly configured to move the movable driven sheave member in relation to the fixed driven sheave member based at least on torque applied to the driven torque sensitive assembly;
wherein the driven torque sensitive assembly further includes,
a driven spider coupled to the driven post, rotation of the driven spider fixed to the rotation of the driven post, the driven spider including at least one driven spider arm;
a driven cam roller rotatably coupled on each driven spider arm;
a driven cam coupled to the movable driven sheave member, the driven cam having at least one cutout portion forming driven cam profile surfaces, each driven cam roller positioned within a cutout portion of the at least one cutout portion, each driven cam roller configured to engage associated driven cam profile surfaces to communicate torque and rotation between the driven spider and driven cam; and
at least one actuator operationally coupled to one of the drive clutch and driven clutch to selectively move one of the movable drive sheave member and the movable driven sheave member independent of the respective drive sensitive assembly and driven torque sensitive assembly to achieve at least one of uniform clamping of the endless loop member and a ratio change across the UCAS IVT system.

2. The UCAS IVT system of claim 1, wherein at least one of the drive clutch and driven clutch further comprises:
an activation spider including activation rollers, the activation spider configured to move axially; and
an activation cam having roller guide cutout sections, the activation rollers received within the roller guide cutout sections of the activation cam, the actuator operationally coupled to the activation cam to selectively rotate the activation cam to cause the activation spider to move an associated one of the movable drive sheave member and moveable driven sheave member independent of an associated one of the drive sensitive assembly and driven torque sensitive assembly.

3. The UCAS IVT system of claim 2, further comprising;
an activation elongated member operationally coupled to the actuator;
an attachment member operationally coupled to an end of the activation elongated member; and
an activation bracket operationally coupled to the activation cam, the attachment member pivotally coupled to the activation bracket.

4. The UCAS IVT system of claim 1, wherein the at least one actuator is configured to push one of the movable drive sheave member and the movable driven sheave member to achieve one of uniform clamping of the endless loop member and clamp bias to produce a change in ratio across the UCAS IVT system.

5. The UCAS IVT system of claim 1, further comprising;
at least one sensor to generate sensor information;
at least one memory to store at least operating instructions; and
a controller configured to control the actuator based on the stored operating instructions and the sensor information.

6. The UCAS IVT system of claim 1, wherein the drive sensitive assembly further comprises:
a drive spider coupled to the drive post, rotation of the drive spider fixed to the rotation of the drive post, the drive spider including at least one drive spider arm;
a drive cam roller rotatably coupled on each drive spider arm;
a drive cam coupled to the movable drive sheave member, the drive cam having at least one cutout portion forming drive cam profile surfaces, each drive cam roller positioned within a cutout portion of the at least one cutout portion, each drive cam roller configured to engage associated drive cam profile surfaces to communicate torque and rotation between the drive spider and drive cam.

7. The UCAS IVT system of claim 1, wherein the drive torque sensitive assembly further comprises:
a drive bias member configured to assert a select bias force on the movable drive sheave member to initiate a clamp force on the endless loop member.

8. The UCAS IVT system of claim 1, wherein the driven torque sensitive assembly further comprises:
a driven bias member configured to assert a select bias force on the movable driven sheave member to initiate a clamp force on the endless loop member.

9. A clutch assembly for an infinitely variable transmission system, the clutch assembly comprising:
a clutch including,
a post;
a movable sheave member slidably mounted on the post;
a fixed sheave member mounted in an axially fixed configuration on the post;

a sensitive assembly in operational communication with the movable sheave member, the sensitive assembly configured to move the movable sheave member in relation to the fixed sheave member based on the sensitive assembly; and an actuator operationally coupled the movable sheave member to selectively move the movable sheave member independent of the sensitive assembly, the actuator including, an activation spider including activation rollers, the activation spider configured to move axially, and an activation cam having roller guide cutout sections, the activation rollers received within the roller guide cutout sections of the activation cam, the actuator operationally coupled to the activation cam to selectively rotate the activation cam to cause the activation spider to move the movable sheave member independent of the sensing assembly.

10. The clutch assembly of claim 9, wherein the clutch is a drive clutch, further wherein:
the post is configured to be in operational communication with a motor; and
the movable sheave member and fixed sheave member configured to be in operational communication with an endless loop member.

11. The clutch assembly of claim 9, wherein the clutch is a driven clutch, further wherein:
the post is configured to be in operational communication with a drivetrain; and
the movable sheave member and fixed sheave member configured to be in operational communication with an endless loop member.

12. The clutch assembly of claim 9, wherein the sensitive assembly is one of a torque sensitive assembly and RPM sensitive elements.

13. The clutch assembly of claim 9, further comprising;
an activation elongated member operationally coupled to the actuator;
an attachment member operationally coupled to an end of the activation elongated member; and
an activation bracket operationally coupled to the activation cam, the attachment member pivotally coupled to the activation bracket.

14. The clutch assembly of claim 9, wherein the actuator is configured to push the movable sheave member to move the movable sheave member.

15. A vehicle having a uniform clamp actuated shift infinitely variable transmission (UCAS IVT) system, the vehicle comprising:
a motor to generate engine torque and rotation;
a drivetrain;
the UCAS IVT system including,
an endless loop member;
a drive clutch including,
a drive post operationally coupled to the motor,
a movable drive sheave member slidably mounted on the drive post,
a fixed drive sheave member mounted in an axially fixed configuration on the drive post, and a drive sensitive assembly in operational communication with the movable drive sheave member, the drive sensitive assembly configured to move the movable drive sheave member in relation to the fixed drive sheave member based at least in part on one of torque and RPM applied to the drive torque sensitive assembly;

a driven clutch, the drive clutch and driven clutch configured to communicate torque and rotation between each other with the endless loop member, the driven clutch including, a driven post operationally coupled to the drivetrain, a movable driven sheave member slidably mounted on the driven post, a fixed driven sheave member mounted in an axially fixed configuration on the driven post, and a driven torque sensitive assembly in operational communication with the movable driven sheave member, the driven torque sensitive assembly configured to move the movable driven sheave member in relation to the fixed driven sheave member based at least in part on torque applied to the driven torque sensitive assembly, wherein the driven torque sensitive assembly further includes, a driven spider coupled to the driven post, rotation of the driven spider fixed to the rotation of the driven post, the driven spider including at least one driven spider arm, a driven cam roller rotatably coupled on each driven spider arm, and a driven cam coupled to the movable driven sheave member, the driven cam having at least one cutout portion forming driven cam profile surfaces, each driven cam roller positioned within a cutout portion of the at least one cutout portion, each driven cam roller configured to engage associated driven cam profile surfaces to communicate torque and rotation between the driven spider and driven cam; and at least one actuator operationally coupled to one of the drive clutch and driven clutch to selectively move one of the movable drive sheave member and the movable driven sheave member independent of the respective drive sensitive assembly and driven torque sensitive assembly to achieve at least one of uniform clamping of the endless loop member and to produce a ratio change across the UCAS IVT system.

16. The vehicle of claim 15, further comprising:
at least one sensor to generate sensor information;
at least one memory to store at least operating instructions; and
a controller configured to control the actuator based on the stored operating instructions and the sensor information.

17. The vehicle of claim 15, wherein the at least one actuator is configured to push one of the movable drive sheave member and the movable driven sheave member to selectively move the one of the movable drive sheave member and driven sheave member.

* * * * *

UNITED STATES PATENT AND TRADEMARK OFFICE
CERTIFICATE OF CORRECTION

| | |
|---|---|
| PATENT NO. | : 11,592,100 B2 |
| APPLICATION NO. | : 16/918184 |
| DATED | : February 28, 2023 |
| INVENTOR(S) | : Bonham et al. |

It is certified that error appears in the above-identified patent and that said Letters Patent is hereby corrected as shown below:

In the Claims

At Column 18, Line 51, please remove --torque-- between "the drive" and "sensitive assembly".

Signed and Sealed this
Eighth Day of August, 2023

*Katherine Kelly Vidal*

Katherine Kelly Vidal
*Director of the United States Patent and Trademark Office*